US012468105B2

(12) United States Patent
Schoenfelder et al.

(10) Patent No.: US 12,468,105 B2
(45) Date of Patent: *Nov. 11, 2025

(54) SPLICE CLOSURE

(71) Applicant: COMMSCOPE TECHNOLOGIES LLC, Hickory, NC (US)

(72) Inventors: Rodney C. Schoenfelder, Shakopee, MN (US); Scott Jean Anderson, Burnsville, MN (US); David Patrick Percival, Tabernash, CO (US); James J. Solheid, Minneapolis, MN (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 411 days.

This patent is subject to a terminal disclaimer.

(21) Appl. No.: 17/430,276

(22) PCT Filed: Feb. 10, 2020

(86) PCT No.: PCT/US2020/017457
§ 371 (c)(1),
(2) Date: Aug. 11, 2021

(87) PCT Pub. No.: WO2020/167639
PCT Pub. Date: Aug. 20, 2020

(65) Prior Publication Data
US 2022/0196956 A1    Jun. 23, 2022

Related U.S. Application Data

(60) Provisional application No. 62/934,273, filed on Nov. 12, 2019, provisional application No. 62/803,961, filed on Feb. 11, 2019.

(51) Int. Cl.
*G02B 6/44* (2006.01)

(52) U.S. Cl.
CPC ....... *G02B 6/4455* (2013.01); *G02B 6/44524* (2023.05); *G02B 6/4459* (2013.01); *G02B 6/44526* (2023.05)

(58) Field of Classification Search
CPC .... G02B 6/55; G02B 6/4452; G02B 6/44524; G02B 6/4455
See application file for complete search history.

(56) References Cited

U.S. PATENT DOCUMENTS 4,266,853 A * 5/1981 Hutchins .............. G02B 6/4454
211/47
4,995,688 A * 2/1991 Anton .................. G02B 6/4454
385/53

(Continued)

FOREIGN PATENT DOCUMENTS

ES       2451509 A2 * 3/2014 .............. G02B 6/44
WO    2013/092251 A1   6/2013
WO    2020/041255 A1   2/2020

OTHER PUBLICATIONS

International Search Report and Written Opinion of the International Searching Authority for International Patent Application No. PCT/US2020/017457 mailed Jun. 15, 2020, 10 pages.

(Continued)

*Primary Examiner* — Eric Wong
(74) *Attorney, Agent, or Firm* — Merchant & Gould P.C.

(57) ABSTRACT

A splice equipment assembly includes two routing paths along opposite sides of a splice region. The two routing paths do not cross. The two routing paths do not extend circumferentially around the splice region. The two routing paths provide adequate slack to allow a splice tray to be removed from the splice region and moved to a workstation outside of the splice equipment assembly. Multiple splice (Continued)

equipment assemblies can be mounted to the same rack (e.g., at a front and rear of the rack).

11 Claims, 22 Drawing Sheets

(56) References Cited

U.S. PATENT DOCUMENTS

| | | | |
|---|---|---|---|
| 6,215,938 | B1 | 4/2001 | Reitmeier et al. |
| 6,535,682 | B1 * | 3/2003 | Puetz ................. G02B 6/44528 385/137 |
| 6,792,191 | B1 * | 9/2004 | Clapp, Jr. ............ G02B 6/4452 385/135 |
| 9,709,765 | B2 | 7/2017 | Wells et al. |
| 2003/0190035 | A1 | 10/2003 | Knudsen et al. |
| 2004/0146266 | A1 | 7/2004 | Solheid et al. |
| 2004/0228598 | A1 | 11/2004 | Allen et al. |
| 2008/0079341 | A1 * | 4/2008 | Anderson ................ H04Q 1/06 312/287 |
| 2008/0080829 | A1 | 4/2008 | Smith et al. |
| 2008/0212928 | A1 | 9/2008 | Kowalczyk et al. |
| 2008/0247723 | A1 | 10/2008 | Herzog et al. |
| 2010/0125998 | A1 | 5/2010 | Kowalczyk et al. |
| 2013/0134116 | A1 | 5/2013 | Taylor |
| 2016/0259129 | A1 * | 9/2016 | Geens .................. G02B 6/4455 |
| 2017/0045701 | A1 | 2/2017 | Diepstraten et al. |
| 2017/0235067 | A1 | 8/2017 | Holmberg et al. |
| 2017/0343755 | A1 | 11/2017 | Landry et al. |
| 2018/0045904 | A1 | 2/2018 | Smith et al. |
| 2018/0224621 | A1 | 8/2018 | Campbell et al. |
| 2018/0284377 | A1 * | 10/2018 | Chiron ................. G02B 6/4454 |
| 2021/0173165 | A1 | 6/2021 | Solheid et al. |

OTHER PUBLICATIONS

NG4access Flex Frame: Patch Cord Routing Guide, TC-96264-IP, CommScope®, 8 pages (Feb. 2019).
Flex Frame Splice Cabinet; User Manual, TC-96272-IP, CommScope®, 20 pages (Jun. 2019).
Extended European Search Report for European Patent Application No. 19852770.7 mailed Apr. 19, 2022, 8 pages.
International Search Report and Written Opinion of the International Searching Authority for International Patent Application No. PCT/US2019/047182 mailed Dec. 13, 2019, 12 pages.
Extended European Search Report for European Application No. 20756705.8 mailed Nov. 15, 2022.
U.S. Office Action for U.S. Appl. No. 17/269,656 mailed Oct. 6, 2023 (13 pages).

* cited by examiner

SPLICE CLOSURE

CROSS-REFERENCE TO RELATED APPLICATIONS

This application is a National Stage Application of PCT/US2020/017457, filed on Feb. 10, 2020, which claims the benefit of U.S. Patent Application Ser. No. 62/803,961, filed on Feb. 11, 2019, and claims the benefit of U.S. Patent Application Ser. No. 62/934,273, filed on Nov. 12, 2019, the disclosures of which are incorporated herein by reference in their entireties. To the extent appropriate, a claim of priority is made to each of the above disclosed applications.

BACKGROUND OF THE INVENTION

Telecommunications equipment frames are known for holding equipment and managing telecommunications cables extending to and from the equipment. One common concern with telecommunications equipment frames is ease of managing the cables so as to avoid a cable mess or tangle where adding or removing cables is difficult. Another common concern is compact size for space savings, without compromising the ease of cable and equipment access. Improvements are desired

SUMMARY OF THE INVENTION

One aspect of the present invention relates to a splice equipment assembly for holding one or more splice trays. The splice equipment assembly includes first and second cable routing paths extending along opposite sides of the one or more splice trays. In certain implementations, the first and second cable routing paths extend from a common end of the splice equipment assembly. In certain implementations, the first and second cable routing paths are mirror images of each other. In certain implementations, the first and second cable routing paths each extend over both a rear wall of the splice equipment assembly and a respective side wall of the splice equipment assembly.

Another aspects of the present disclosure relates to a splice equipment assembly that is mountable within a central zone of a frame. In some examples, the splice equipment assembly is recess mounted at the frame. In other examples, the splice equipment assembly is mounted to protrude outwardly from the frame. In some examples, only one splice equipment assembly is mounted at the frame. In other examples, a first splice equipment assembly is mounted at a front of the frame and a second splice equipment assembly is mounted at a rear of the frame. In some examples, the frame is a two-post frame. In other examples, the frame is a four-post frame. In still other implementations, the splice equipment assembly is wall-mountable.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE FIGURES

The accompanying drawings, which are incorporated in and constitute a part of the description, illustrate several aspects of the present disclosure. A brief description of the drawings is as follows.

DETAILED DESCRIPTION

Figure 1:
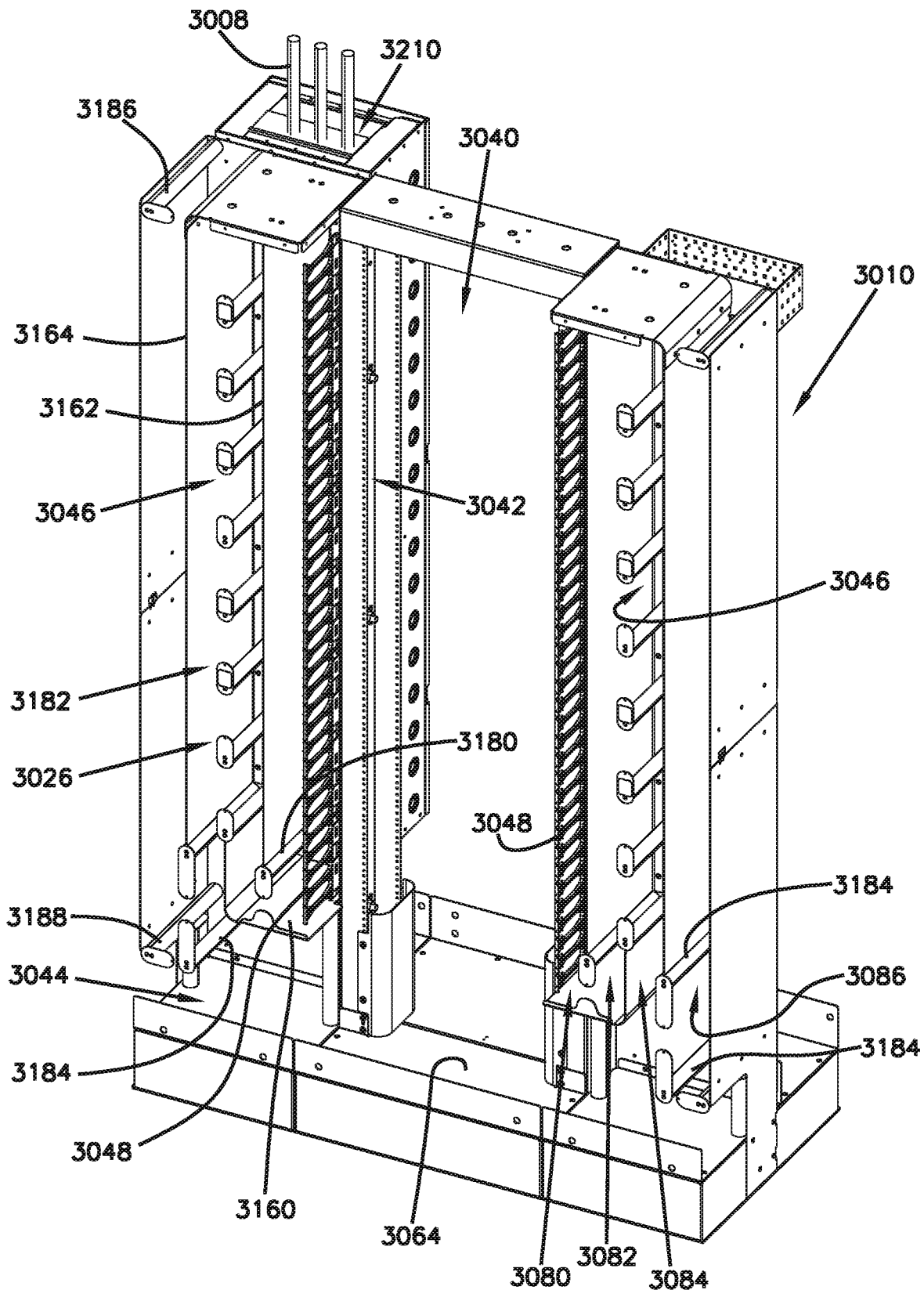
FIG. 1 is a front perspective view of another embodiment of a telecommunications equipment frame configured to hold telecommunications equipment.
Figure 2:
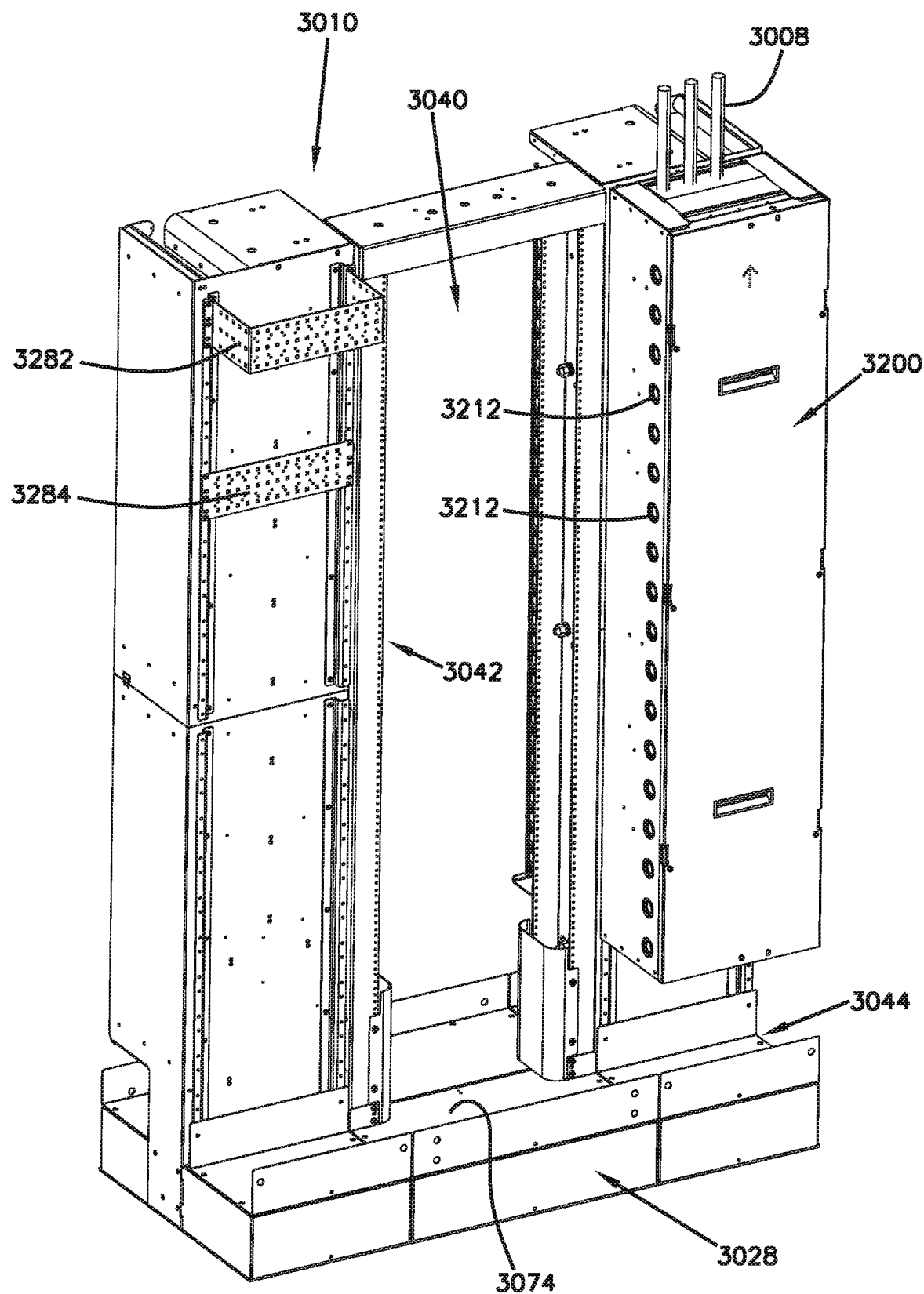
FIG. 2 is a rear perspective view of the telecommunications equipment frame of FIG. 1.
Figure 3:
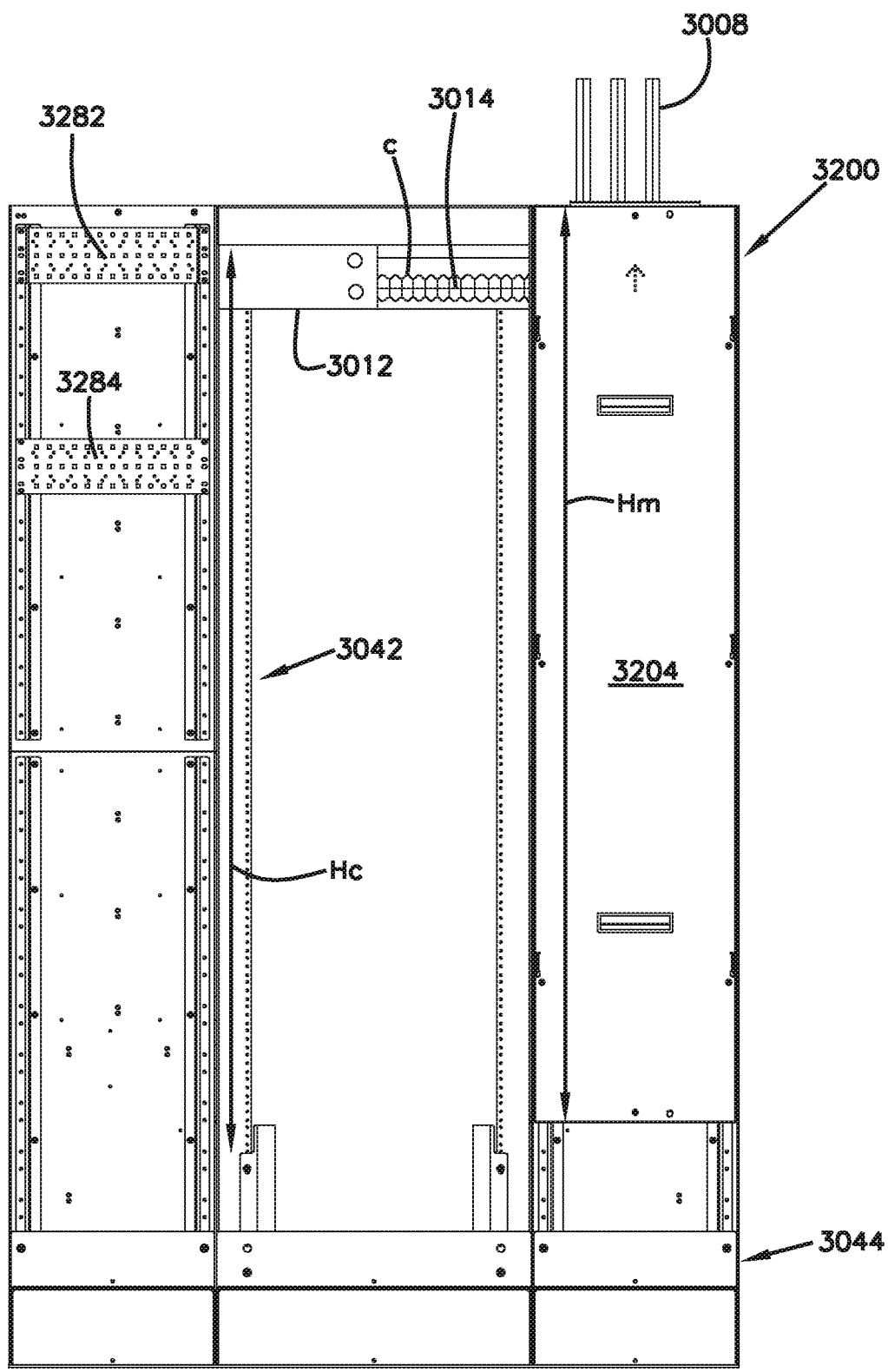
FIG. 3 is a front elevational view of the telecommunications equipment frame of FIG. 1.

Reference will now be made in detail to exemplary aspects of the present disclosure that are illustrated in the accompanying drawings. Wherever possible, the same reference numbers will be used throughout the drawings to refer to the same or like parts.

A frame 3010 (e.g., a telecommunications equipment frame) is shown in FIGS. 1-4. The frame 3010 includes a central zone 3040 disposed between slack storage zones 3046. Central zone 3040 includes an upper equipment zone 3042 and a lower cable tray zone 3044. In an example, the cable tray zone 3044 include only one front tray 3064 and one rear tray 3074.

Equipment 3012 is mountable at the upper equipment zone 3042. Equipment 3012 has incoming and outgoing cables 3014, as well as patch cables or patch cords which connect different pieces of equipment 3012 to each other, or to other telecommunications equipment. The patch cords 3016 typically are managed and connected to equipment 3012 on a front 3026 of frame 3010. The incoming and outgoing cables 3014 are typically managed on a rear 3028 of frame 3010. The patch cord 3016 also can be managed on the rear 3028 of frame 3010.

On either side of central zone 3040 are slack storage zones 3046. In the illustrated embodiment, frame 3010 includes two slack storage zones 3046 which are mirror images of one another. Slack storage zone 3046 includes cable management fingers 3048 in a vertical column dividing the slack storage zone 3046 from the central zone 3040 in the area of the equipment zone 3042. Management fingers support cables exiting horizontally from equipment 3012.

Slack storage zone 3046 includes a first cable channel 3080, a second cable channel 3082, a third cable channel 3084, and a fourth cable channel 3086. These channels are generally vertically oriented for handling cables. Each slack storage zone 3046 includes a lower divider 3160, a first divider 3162 and a second divider 3164 for defining the various channels 3080, 3082, 3084, 3086. Various cable management spools and/or radius limiters are utilized in each slack storage zone 3046 including a lower spool 3180, a column of middle spools 3182, one or more second lower spools 3184, an upper radius limiter 3186, and a lower radius limiter 3188. The lower divider 3160 encourages a technician to use a proper spool 3182 for slack storage.

In accordance with some aspects of the disclosure, a splice equipment assembly 3200 can be mounted at the rear 3028 of the frame 3010. For example, the splice equipment assembly 3200 can be mounted at the rear 3028 to one side of the central zone 3040. Cables on rear 3028 of frame 3010, such as the incoming and outgoing cables 3014, can be spliced to one or more trunk cables 3008 routed to the frame 3010.

Frame 3010 also may include one or more rear mounting strips and/or a plurality of rear brackets 3282, 3284 at the rear of the frame 3010 at the opposite side of the central zone 3040. Brackets 3282 are shown as U-shaped, and brackets 3284 are shown as planar shapes.

Figure 4:
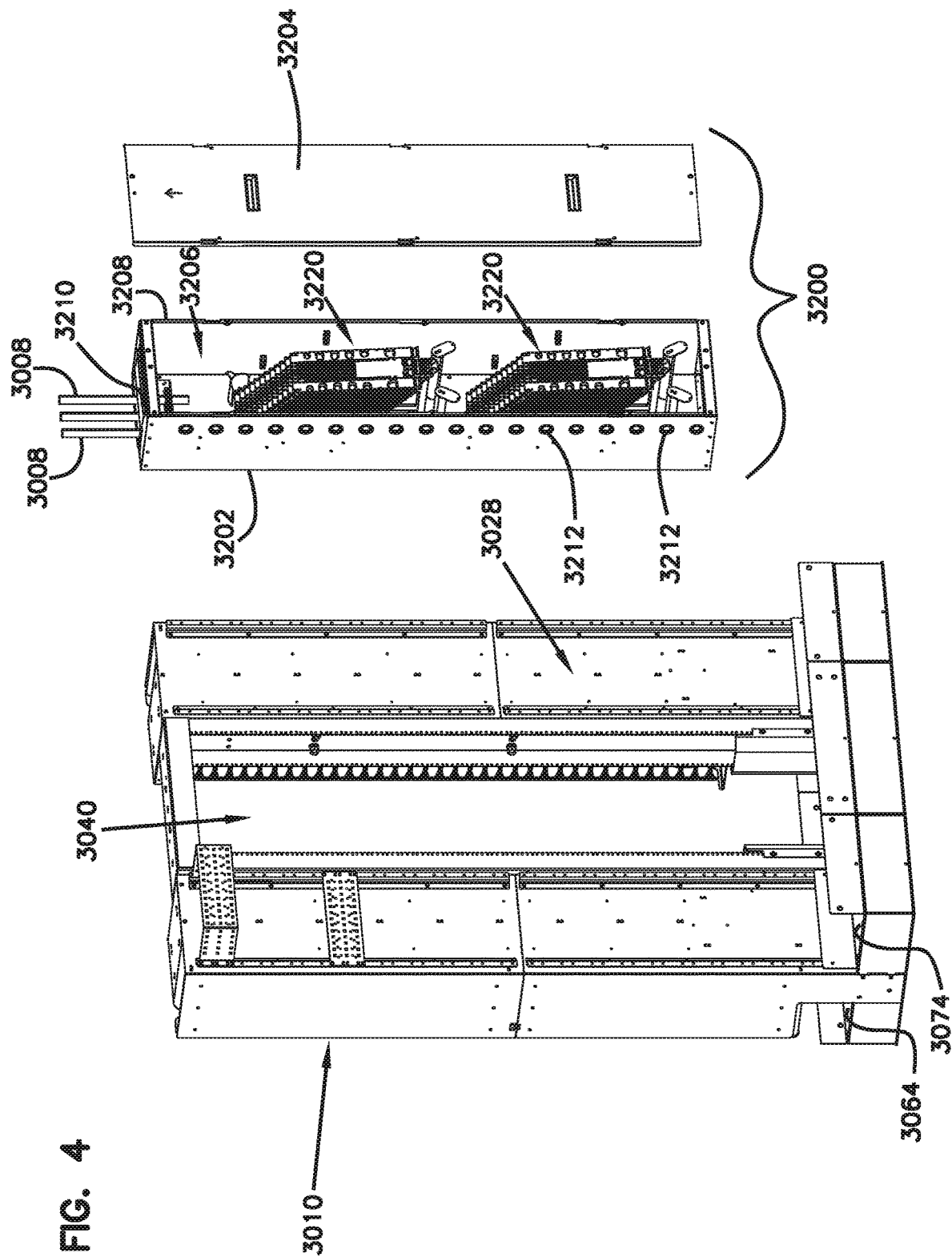
FIG. 4 is a rear perspective view of the telecommunications equipment frame of FIG. 1 with a splice equipment assembly exploded rearwardly from the frame and a cover exploded away from the splice equipment assembly.

As shown in FIG. 4, the splice equipment assembly 3200 includes a body 3202 and a cover 3204. The body 3202 defines an interior 3206 accessible through an access aperture 3208. The cover 3204 is movable to selectively cover and expose the access aperture 3208. In some examples, the cover 3204 is pivotable relative to the body 3202. In other examples, the cover 3204 is removable from the body 3202 (e.g., by lifting the cover 3204 to free tabs of the cover 3204 from slots defined by the body 3202).

The body 3202 also defines a trunk cable port arrangement 3210 through which the trunk cables 3008 may extend into the interior 3206 of the splice equipment assembly 3200 and at least one equipment cable port 3212 through which the incoming and outgoing cables 3014 of the equipment 3012 may extend into the interior 3206 of the splice equipment assembly 3200. One or more splice trays 3224 are disposed within the interior 3206. The trunk cables 3008 are optically coupled to the incoming and outgoing cables 3014 at the splice trays 3224. A user may access the splice trays 3224 through the access aperture 3208.

In certain examples, the incoming and outgoing cables 3014 include fibers or fiber ribbons disposed within protective sleeving (e.g., mesh sleeves). The protective sleeving may have first ends disposed within the equipment 3012 and second ends that are disposed within the splice equipment assembly 3200 when the incoming and outgoing cables 3014 are routed to the splice trays 3224 within the splice equipment assembly 3200. In certain examples, the second ends of the protective sleeving may be routed to the respective splice trays 3224. In an example, the second ends of the protective sleeving may be anchored to the respective splice trays 3224.

In certain implementations, a conduit C may be positioned around the incoming and outgoing cables 3014 between the equipment 3012 and the splice equipment assembly 3200. In certain examples, the conduit C includes a corrugated tube (e.g., a plastic tube). In certain examples, the conduit C is slit to enable lateral mounting of the conduit C about the cables 3014. In some examples, the conduit C surrounds the protective sleeving disposed about the incoming and outgoing cables 3014. In other examples, the incoming and outgoing cables 3014 within the conduit C do not have protective sleeving.

In some examples, the conduit C extends to the equipment cable port 3212. In certain examples, the conduit C extends at least partially through the equipment cable port 3212. In an example, an end of the conduit C is secured at the equipment cable port 3212 (e.g., clamped at a plug received in the equipment cable port 3212). In other examples, the conduit C extends through the equipment cable port 3212 and into an interior 3206 of the splice equipment assembly 3200. In some examples, the conduit C extends from an interior of the equipment 3012. In other examples, the conduit C extends from an exterior of the equipment 3012 adjacent an exit cable port.

In certain implementations, the body 3202 of the splice equipment assembly 3200 includes a rear wall 3230, a first side wall 3232, an opposite second side wall 3234, a bottom wall 3236, and a top wall 3238. In certain examples, the access aperture 3208 is generally defined by edges of the first side wall 3232, the second side wall 3234, the bottom wall 3236, and the top wall 3238. Retaining lips 3240 may extend into the access aperture 3208 from the bottom wall 3236 and/or from the top wall 3238.

In certain examples, the trunk cable port arrangement 3210 is disposed at the top wall 3238. In some examples, the trunk cable port arrangement 3210 includes a single aperture through which multiple trunk cables 3008 may extend. In other examples, the trunk cable port arrangement 3210 includes a plurality of apertures through which respective trunk cables may extend. In some examples, the trunk cable port arrangement 3210 is environmentally sealed. In other examples, the trunk cable port arrangement 3210 may include a non-sealing cover 3214 to inhibit dust or other such contaminants from entering the splice enclosure. In an example, the cover 3214 includes a brush-style element extending across the one or more apertures of the trunk cable port arrangement 3210.

In certain implementations, the trunk cables 3008 may be anchored within the interior 3206 of the splice equipment assembly 3200. For example, an anchor block 3260 may be disposed within the splice equipment assembly 3200 (e.g., at the rear wall 3230). One or more clamps 3262 are mounted to the anchor block 3260 to hold the trunk cables 3008 to the anchor block 3260. In certain examples, the anchor block 3260 is disposed at an upper portion of the splice module interior 3206 adjacent the trunk cable port arrangement 3210.

In some implementations, the splice equipment assembly 3200 has a height $H_M$ that extends along a majority of a height $H_C$ of the upper equipment zone 3042. In certain implementations, the height $H_M$ is substantially the same as the height $H_C$ of the upper equipment zone 3042. In certain examples, the height $H_M$ of the splice equipment assembly 3200 extends along a majority of a height of the frame 3010. In certain examples, the height $H_M$ of the splice equipment assembly 3200 is sufficient to enable spacing of the equipment cable ports 3212 along the side of the upper equipment zone 3042 so that incoming and outgoing cables 3014 can extend generally straight between the respective equipment 3012 and a respective equipment cable port 3212 (e.g., see FIG. 3).

Figure 5:
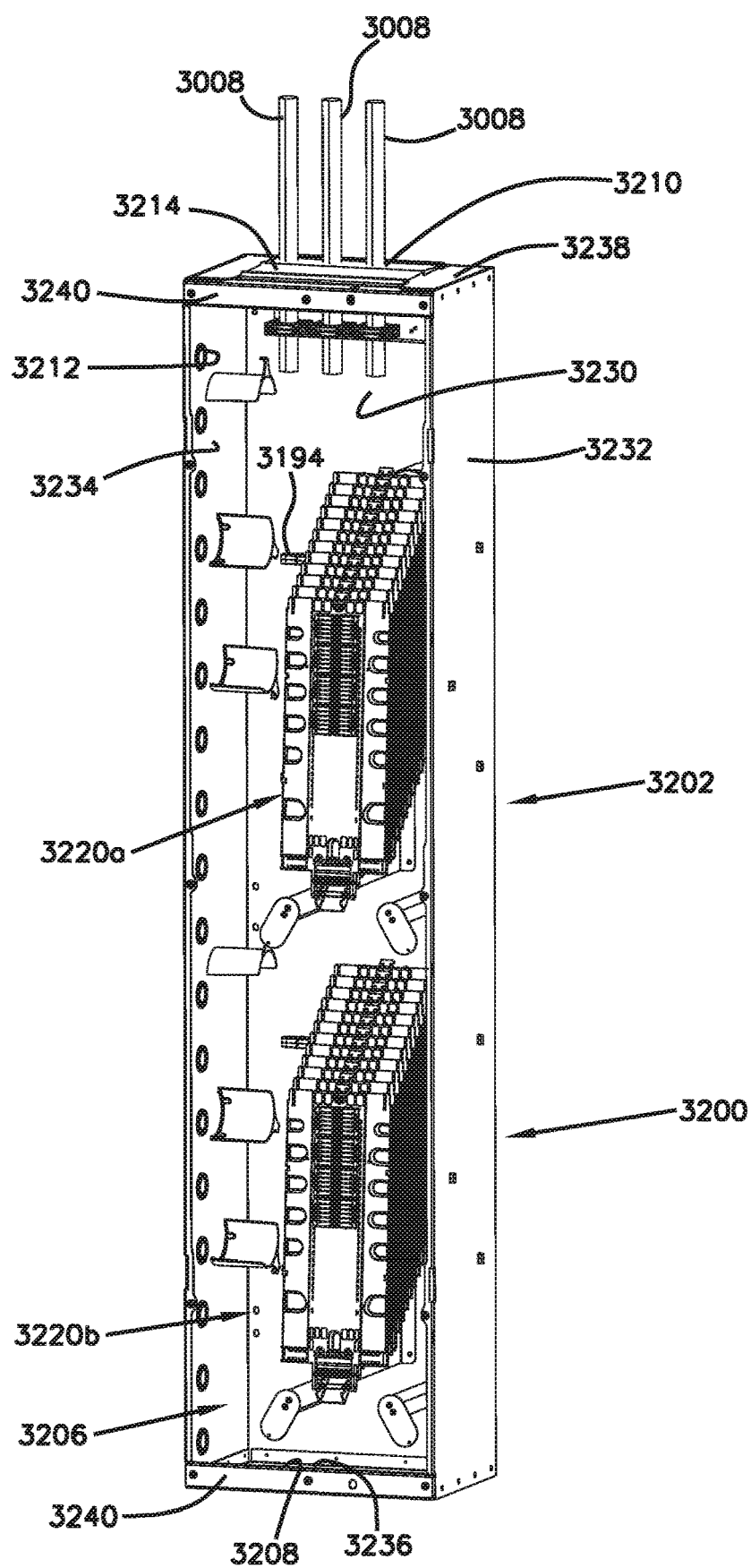
FIG. 5 is a perspective view of an example splice equipment assembly with an access cover removed so that the interior is visible.
Figure 6:
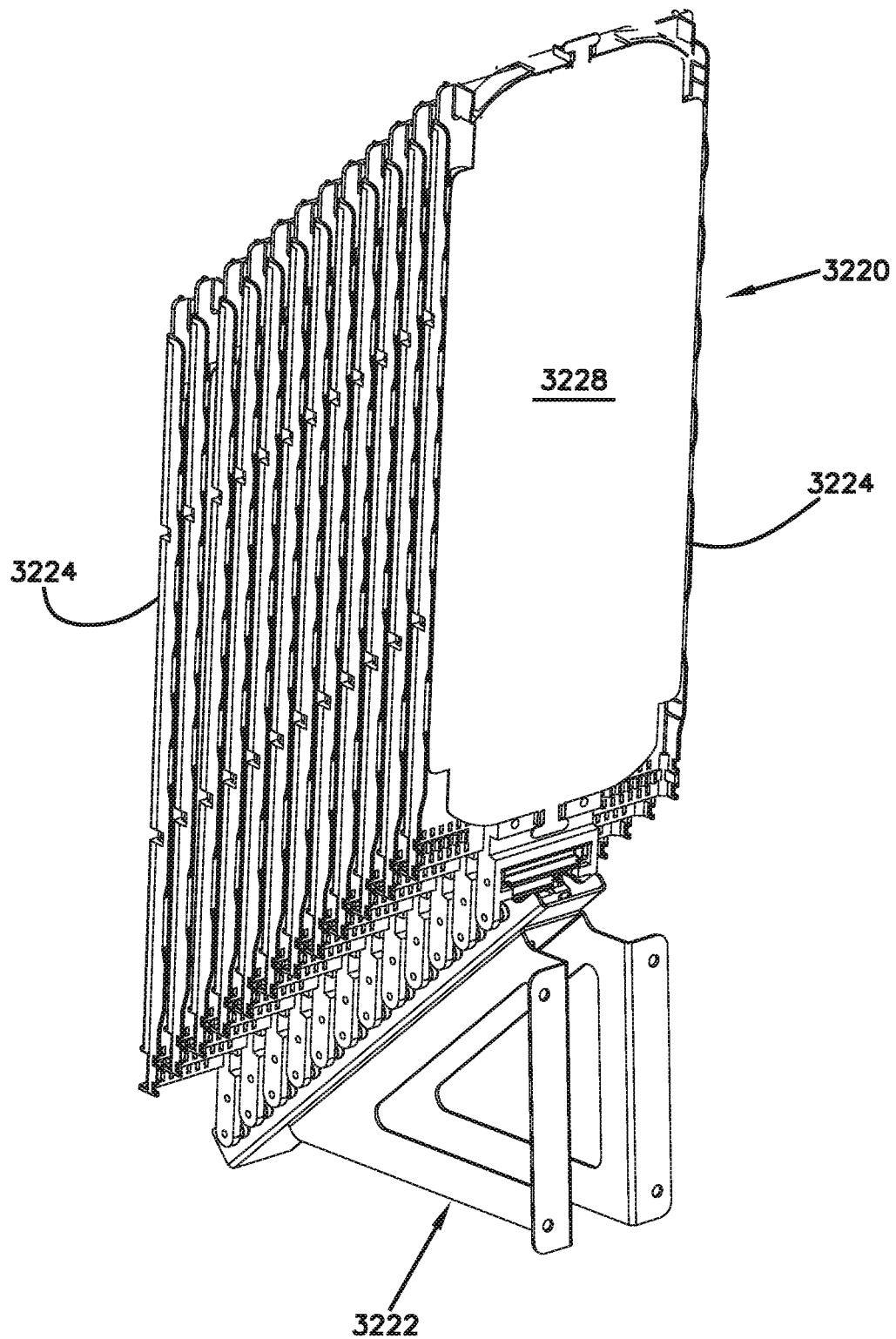
FIG. 6 is a first perspective view of an example splice tray assembly including a plurality of splice trays mounted to a frame.
Figure 7:
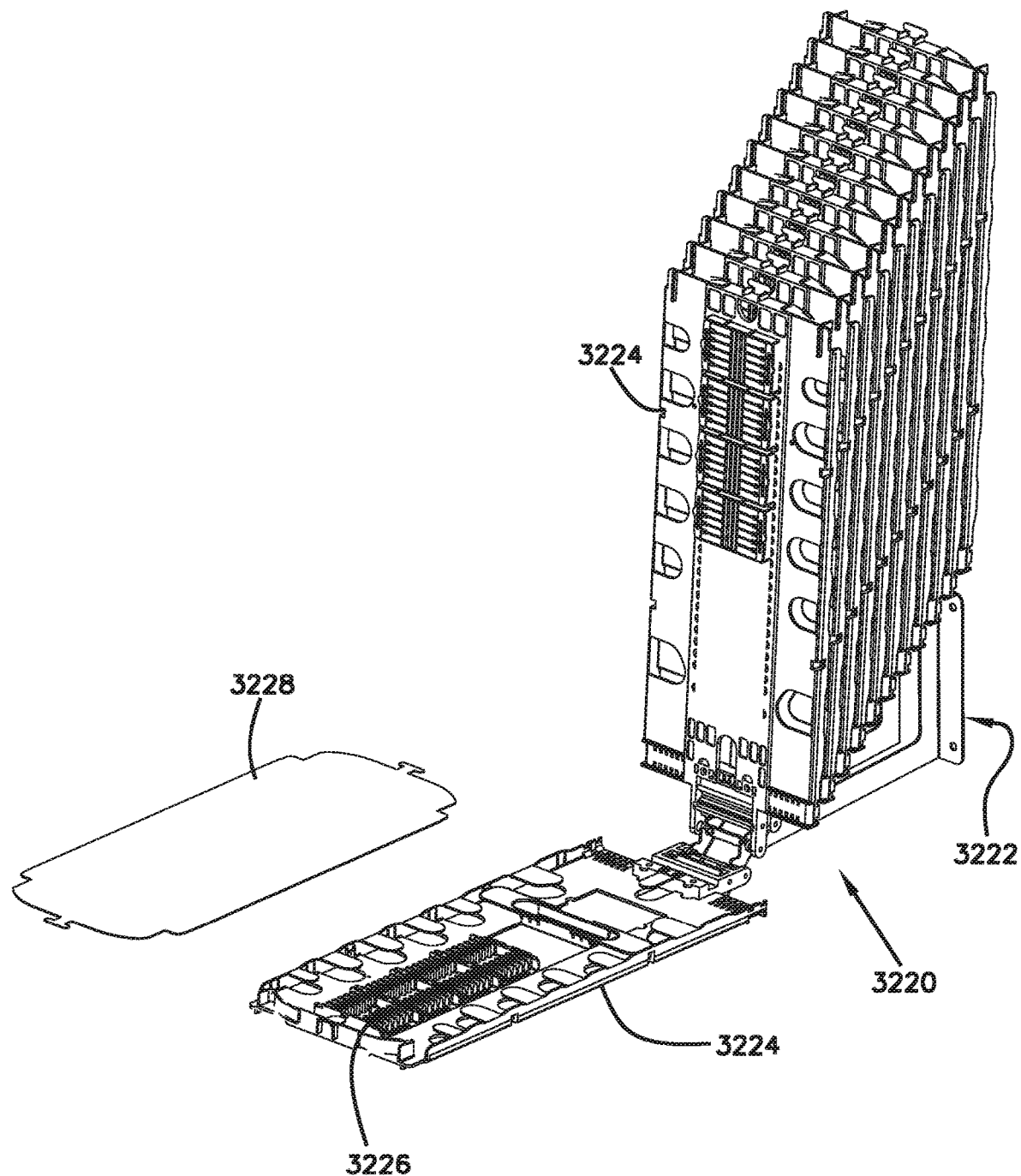
FIG. 7 is a second perspective view of the example splice tray assembly of FIG. 6 showing one splice tray in an access position and the remaining splice trays in a stowed position, a cover being removed from the splice tray in the access position so that splice holders are visible.

As shown in FIGS. 5-7, the splice trays 3224 can be organized into one or more splice tray assemblies 3220. Each splice tray assembly 3220 includes one or more splice trays 3224 coupled to a mounting frame 3222. In certain examples, the mounting frame 3222 secures to the rear wall 3230. In certain examples, the trays 3224 are staggered along the mounting frame 3222 for easier access. For example, each tray 3224 may be mounted at a different position along a ramped surface of the frame 3222. In certain examples, the splice trays 3224 are removably mounted to the frame 3222 so that one or more of the trays 3224 can be removed from the frame 3222 and moved to a nearby work surface without disconnecting the already spliced cables.

In certain implementations, each splice tray 3224 has a first major side and a second major side. The first major side includes splice holders 3226 at which optical splices can be stored. A removable cover 3228 can be disposed at the first major side to cover the splice holders (see FIG. 7).

Each tray 3224 may be separately movable relative to the frame 3222 between a stowed position and an access position. For example, in FIG. 7, a forward-most tray 3224 is disposed in the access position while the remaining trays 3224 of the splice tray assembly 3220 are disposed in the stowed position. When in the access position, the first major side of the tray 3224 is accessible to a technician. When in the stowed position, the first major side faces the rear of the splice equipment assembly 3200 while the second major side faces the access aperture 3208.

Referring to FIGS. 5 and 8-10, certain implementations of the splice equipment assembly 3200 includes a cable routing arrangement 3250 that facilitates routing the cables 3008, 3014 from the cable ports 3210, 3212 to the splice trays 3224. In some implementations, the cable routing arrangement 3250 includes various routing guides that define at least a first routing path P1 between the trunk cable port arrangement 3210 and at least one splice tray 3224 and a second routing path P2 between an equipment cable port 3212 and the at least one splice tray 3224 (see FIG. 8).

In certain implementations, the second routing path P2 is configured such that the incoming and outgoing cables 3014 of the equipment 3012 have a common length. For example, in such implementations, the incoming and outgoing cables 3014 routed to equipment 3012 mounted at a top of the frame 3222 have common lengths with the incoming and outgoing cables 3014 routed to equipment 3012 mounted at a middle of the frame 3222. In certain examples, sufficient slack length of each incoming and outgoing cables 3014 is accommodated along the second routing path P2 to enable the incoming and outgoing cables 3014 to have common lengths.

In certain implementations, the first routing path P1 extends at least partially along the first side wall 3232 and does not extend along the second side wall 3234 while the second routing path P2 extends at least partially along the second side wall 3234 and does not extend along the first side wall 3232. In certain examples, the first routing path P1 extends at least partially along the rear wall 3230. In certain examples, the second routing path P2 extends at least partially along the rear wall 3230. In certain implementations, none of the routing paths P1, P2 extend circumferentially around the splice trays 3224. In certain implementations, the first routing path P1 and the second routing path P2 do not cross or otherwise overlap each other. Advantageously, by not crossing or otherwise overlapping the routing paths P1, P2, a splice tray 3224 to which fibers are routed can be more easily removed from the splice equipment assembly 3200 without disconnecting the fibers from the splice tray 3224.

In certain implementations, multiple groups 3220 of splice trays 3224 are disposed within the interior 3206 of the splice equipment assembly 3200. In some such implementations, separate first routing paths lead from the trunk cable port arrangement 3210 to the respective splice tray assemblies 3220 and separate second routing paths lead from certain ones of the equipment ports 3212 to the respective splice tray assemblies 3220.

In certain examples, the interior 3206 of the splice equipment assembly 3200 includes a plurality of regions, each region has a respective splice tray assembly 3220. In examples, each region has respective first and second cable routing paths P1, P2 to the splice tray assembly 3220. In an example, each region has a respective set of equipment cable ports 3212. In the example shown, a first region R1 is disposed above a second region R2. In other examples, the splice equipment assembly 3200 may include additional regions. In certain examples, the regions are disposed in a vertical column.

In certain implementations, the first routing path P1 is configured such that the trunk cables 3008 have a common length. For example, the trunk cables 3008 routed to the splice tray assembly 3220 at the first region R1 have a common length with the trunk cables 3008 routed to the splice tray assembly 3220 at the second region R2. In certain examples, sufficient slack length of each trunk cables 3008 is accommodated along the first routing path P1 to enable the trunk cables 3008 to have common lengths.

For example, in FIG. 6, one first routing path P1a extends from the trunk cable port arrangement 3210 towards a first splice tray assembly 3220a (FIG. 5) in the first region R1 and another first routing path P1b extends from the trunk cable port arrangement 3210 towards a second splice tray assembly 3220b (FIG. 5) in the second region R2. One second routing path P2a extends from an equipment cable port 3212 towards the first splice tray assembly 3220a in the first region R1 and another second routing path P2b extends from another equipment cable port 3212 towards the second splice tray assembly 3220b in the second region R2.

In certain implementations, the splice tray splice tray assemblies 3220 are disposed within the interior 3206 so that for each first routing path P1, a majority of the path does not overlap with the other first routing paths P1. In certain implementations, the splice tray assemblies 3220 are disposed within the interior 3206 so that for each second routing path P2, a majority of the path does not overlap with the other second routing paths P2. In certain examples, the first splice tray assembly 3220a is disposed above the second splice tray assembly 3220b. In such examples, one set of first and second cable routing paths P1a, P2a may be disposed above a majority of another set of first and second cable routing paths P1b, P2b.

In certain implementations, one of the second routing paths P2a is provided for fibers extending from any of a first set 3212a (FIG. 9) of the equipment cable ports 3212 and another of the second cable routing paths P2b is provided for fibers extending from any of a second set 3212b (FIG. 9) of the equipment cable ports 3212.

In certain implementations, the cable routing arrangement 3250 includes a combination of bend radius limiters 3252, 3256 and cable clips 3254. For example, various bend radius limiters 3252, 3256 may be disposed at upper and/or lower portions of the cable routing paths P1, P2 to create multiple loops or layers within the path. The cable clips 3254 manage the fibers along the paths P1, P2.

Figure 8:
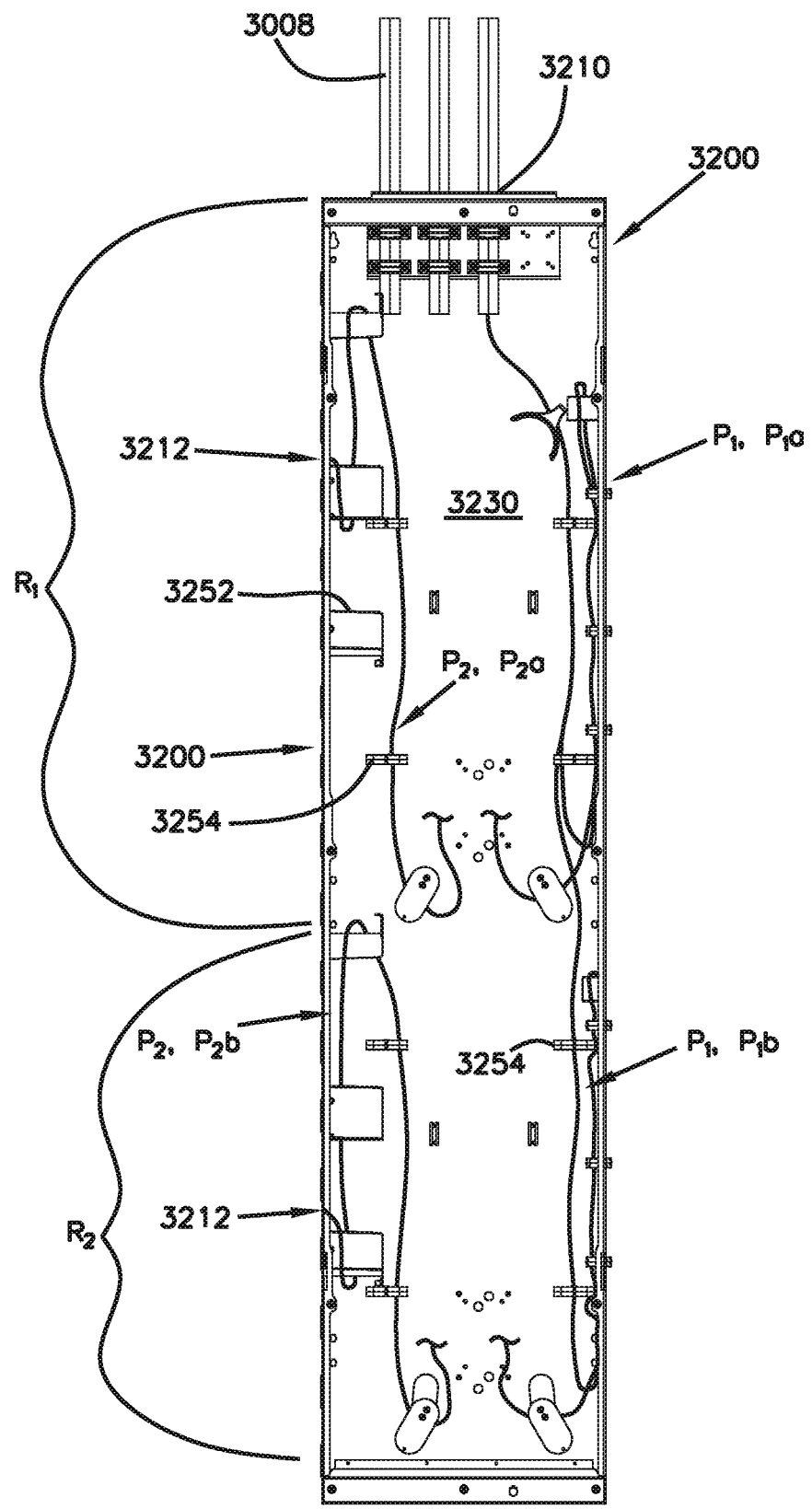
FIG. 8 is an elevational view of the splice equipment assembly of FIG. 5 with the splice tray assemblies removed for ease in viewing the cable routing paths.
Figure 9:
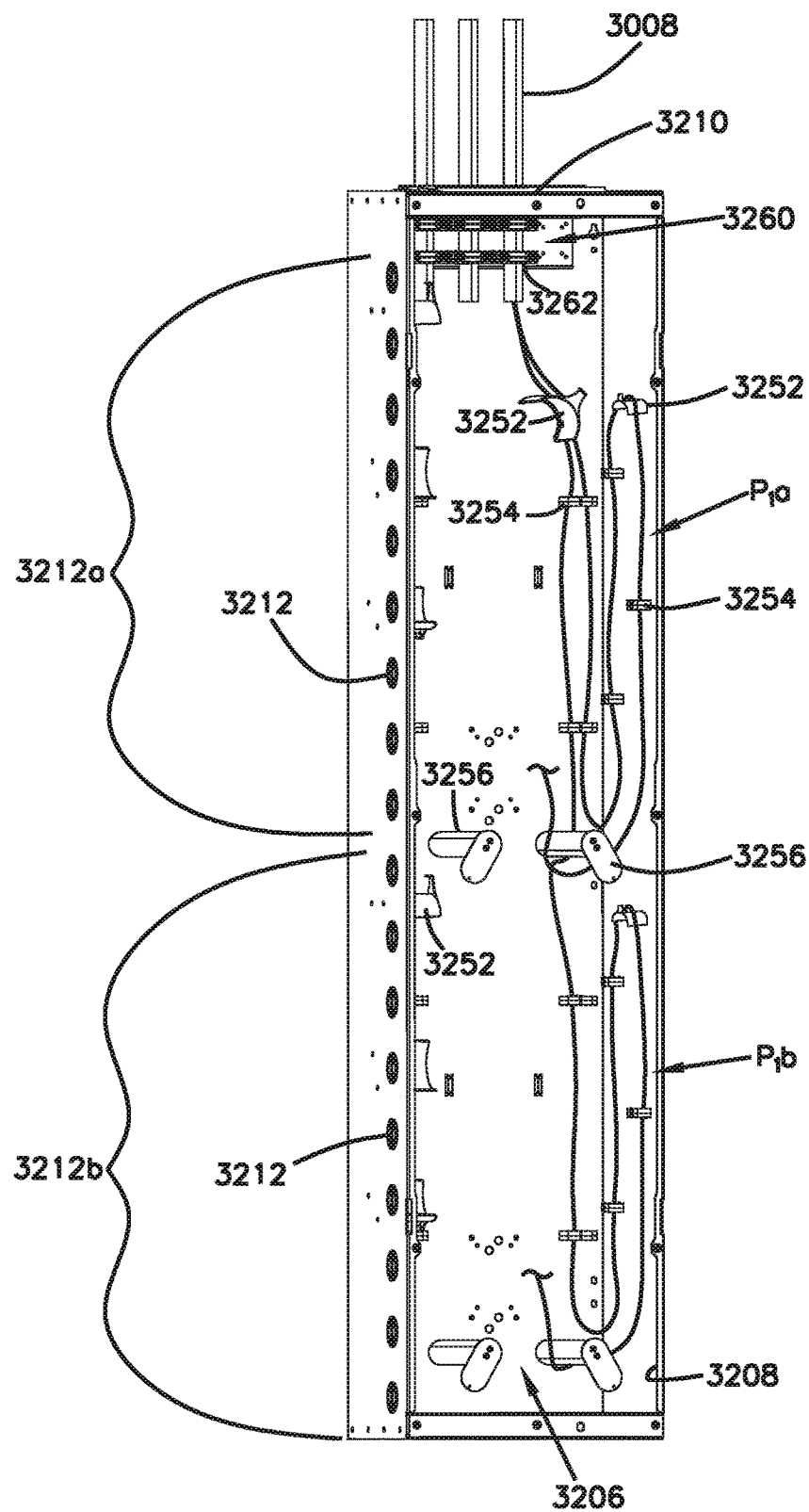
FIG. 9 is another perspective view of the splice equipment assembly of FIG. 5 showing examples of the first cable routing paths.

In the example shown in FIGS. 8 and 9, an example first cable routing path P1a extends from the trunk cable port arrangement 3210 and at least partially down the rear wall 3230. The first cable routing path P1 loops back up an inner surface of the first side wall 3232 towards the rear, loops over a bend radius limiter 3252, and extends back down the inner surface of the first side wall 3232. Finally, the first cable routing path P1 extends from the first side wall 3232, around a spool 3256 or other bend radius limiter and up towards a splice tray 3224. Cable clips 3254 may be disposed at the rear wall 3230 and the inner surface of the first side wall 3232 to hold the fibers at the respective walls. A half spool 3252 or other bend radius limiter may be disposed at the real wall 3230 above the first splice tray assembly 3220 of splice trays 3224 to guide the fibers from the trunk cable to a side of the splice trays 3224. In certain examples, the spool 3256 is sufficiently deep to facilitate routing the trunk cable fibers to any of the splice trays 3224 in the splice tray assembly 3220.

Figure 10:
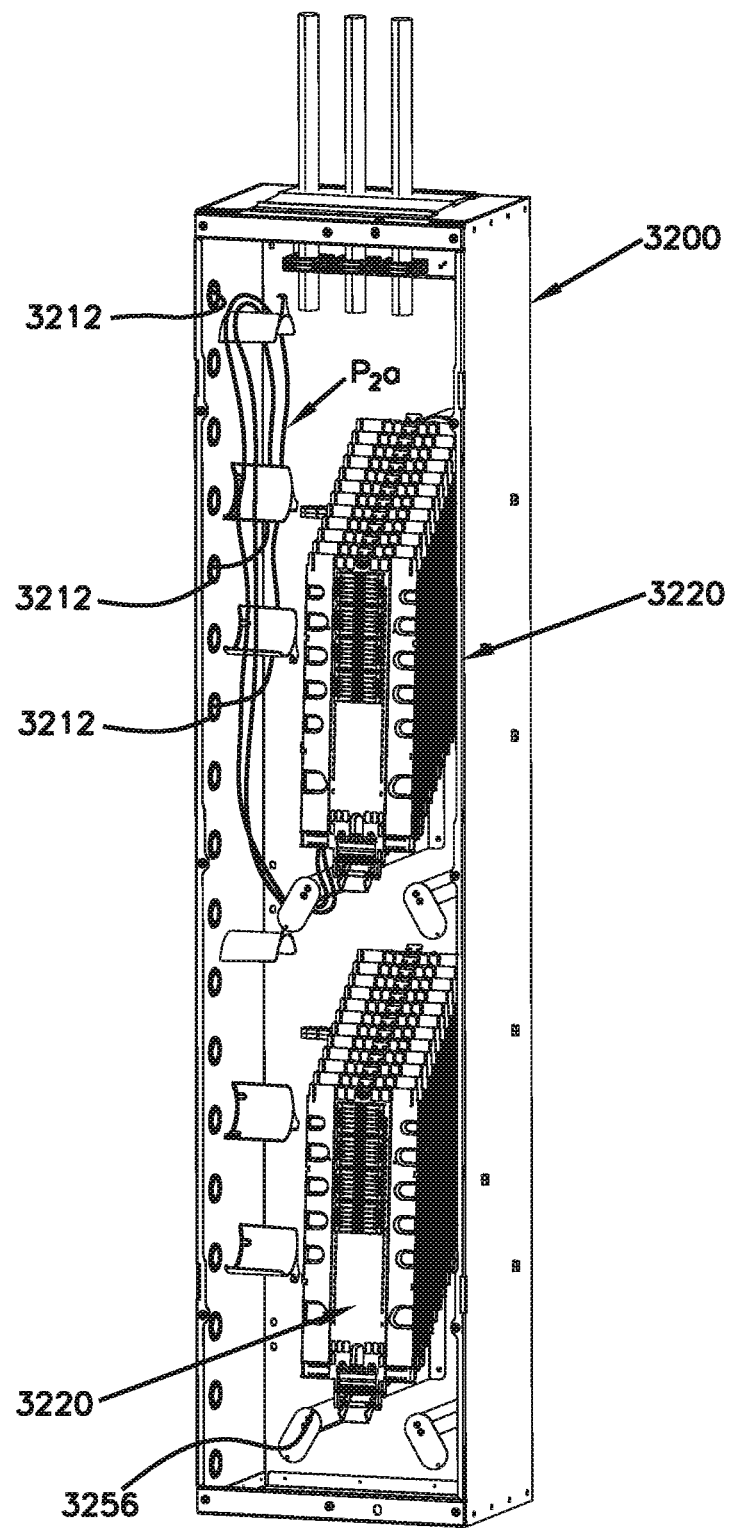
FIG. 10 is a perspective view of an example splice equipment assembly of FIG. 5 showing examples of the second cable routing paths.
Figure 11:
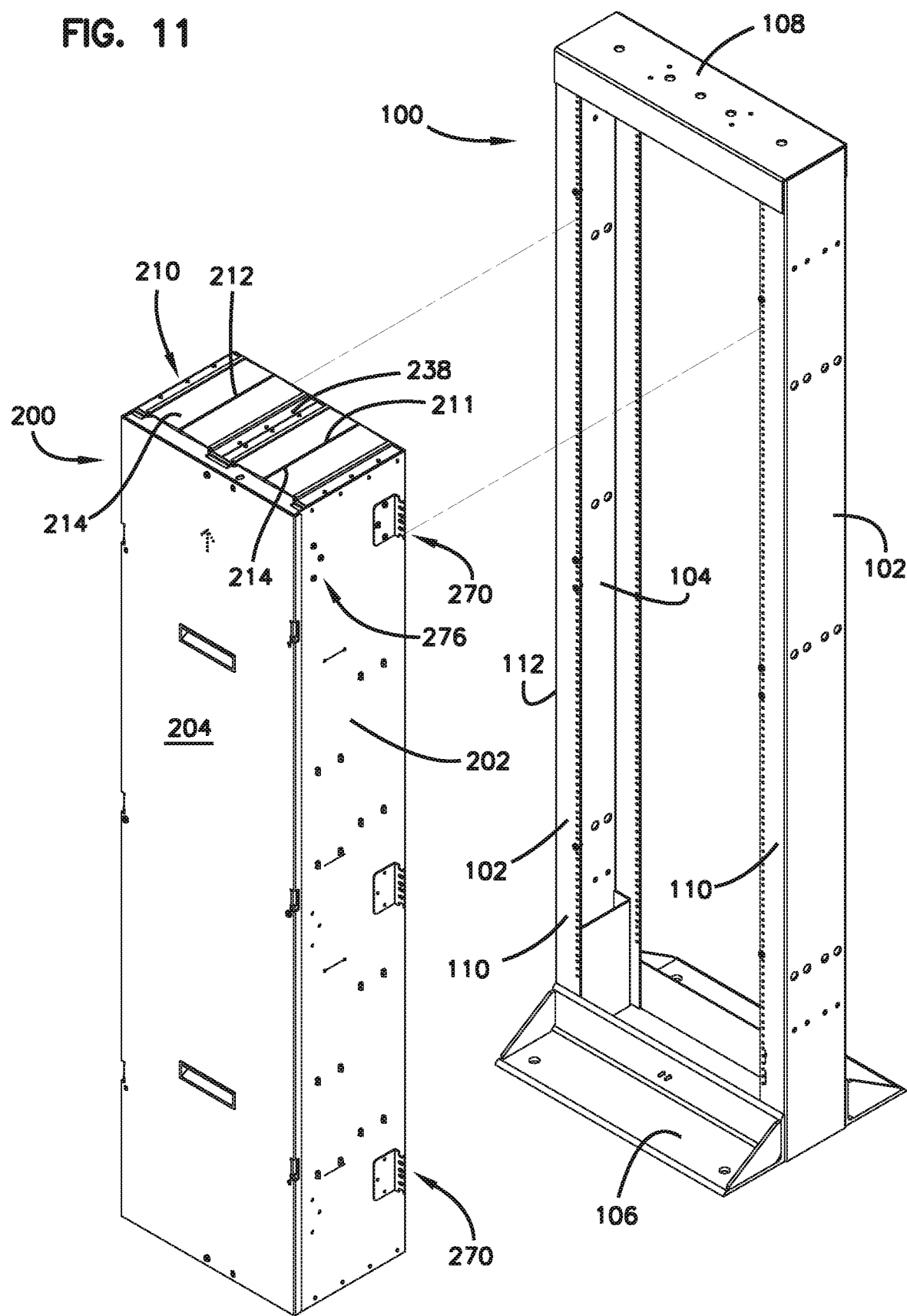
FIG. 11 is a perspective view of another example splice equipment assembly configured in accordance with the principles of the present disclosure exploded forwardly from an example frame.

In the example shown in FIGS. 8 and 10, an example second cable routing path P2a extends from the equipment cable ports 3212, up an inner surface of the second side wall 3234, over a half-spool 3252 or other bend radius limiter, down the inner surface of the second side wall 3234, around a spool 3256 or other bend radius limiter, and up to the splice trays 3224. In certain examples, additional half-spools 3252 or other bend radius limiters may be disposed at the inner surface of the second side wall 3234 to separate the fibers routed up the second side wall 3234 and the fibers routed down the second side wall 3234. The additional radius limiters also may guide the equipment cable fibers from the equipment cable ports 3212 to the upward section of the path towards the rear side of the second side wall 3234.

In some implementations, optical splicing between the equipment cable fibers and the trunk cable fibers is performed while the splice tray 3224 is mounted to the frame 3222 within the splice equipment assembly 3200. For example, the desired splice tray 3224 can be pivoted or otherwise moved to the access position, the cover 3228 can be removed, and the optical splices can be mounted to the tray 3224. In other implementations, the splice tray 3224 is removed from the splice equipment assembly 3200 to optically splice the equipment cable fibers and the trunk cable fibers. For example, the fibers routed to the splice tray 3224 can be unhooked from the radius limiter 3256 to enable the splice tray 3224 to be removed from the frame 3222 and moved to a work station external of the splice equipment assembly 3200.

FIGS. 11-22 illustrate another example splice equipment assembly 200 that can be mounted to a frame 100, 150 or to a wall. For example, the splice equipment assembly 200 mounted to within a central zone 104 of a two-post rack (i.e., a relay rack) 100 (e.g., see FIG. 18) or within a central zone 154 of a four-post rack 150 (e.g., see FIG. 20). In other examples, the splice equipment assembly 200 configured to be wall mounted (e.g., see FIG. 22).

Figure 12:
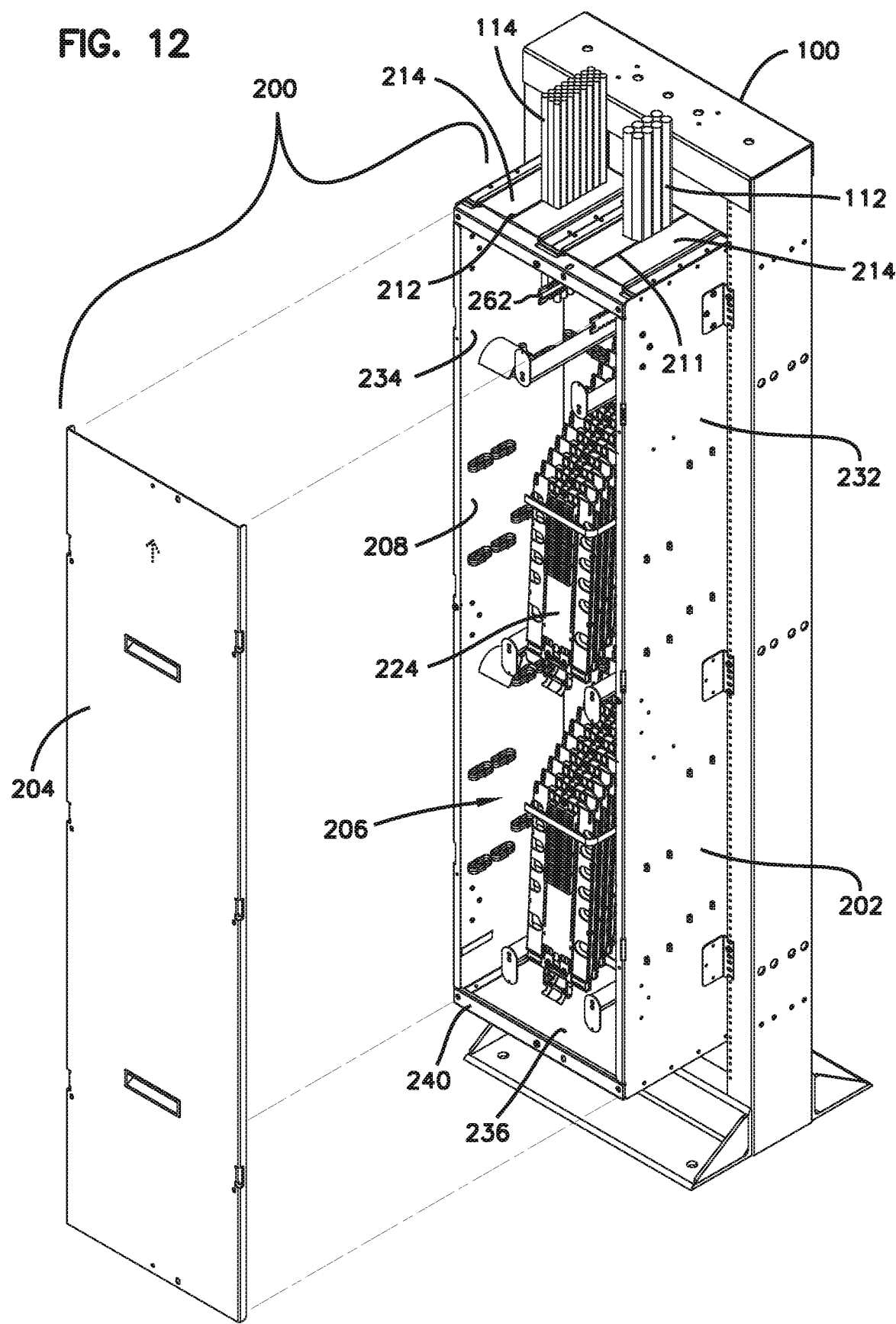
FIG. 12 is a perspective view of the splice equipment assembly of FIG. 11 mounted to the frame with an example cover of the splice equipment assembly exploded away from the body to show details of the interior of the splice equipment assembly.
Figure 13:
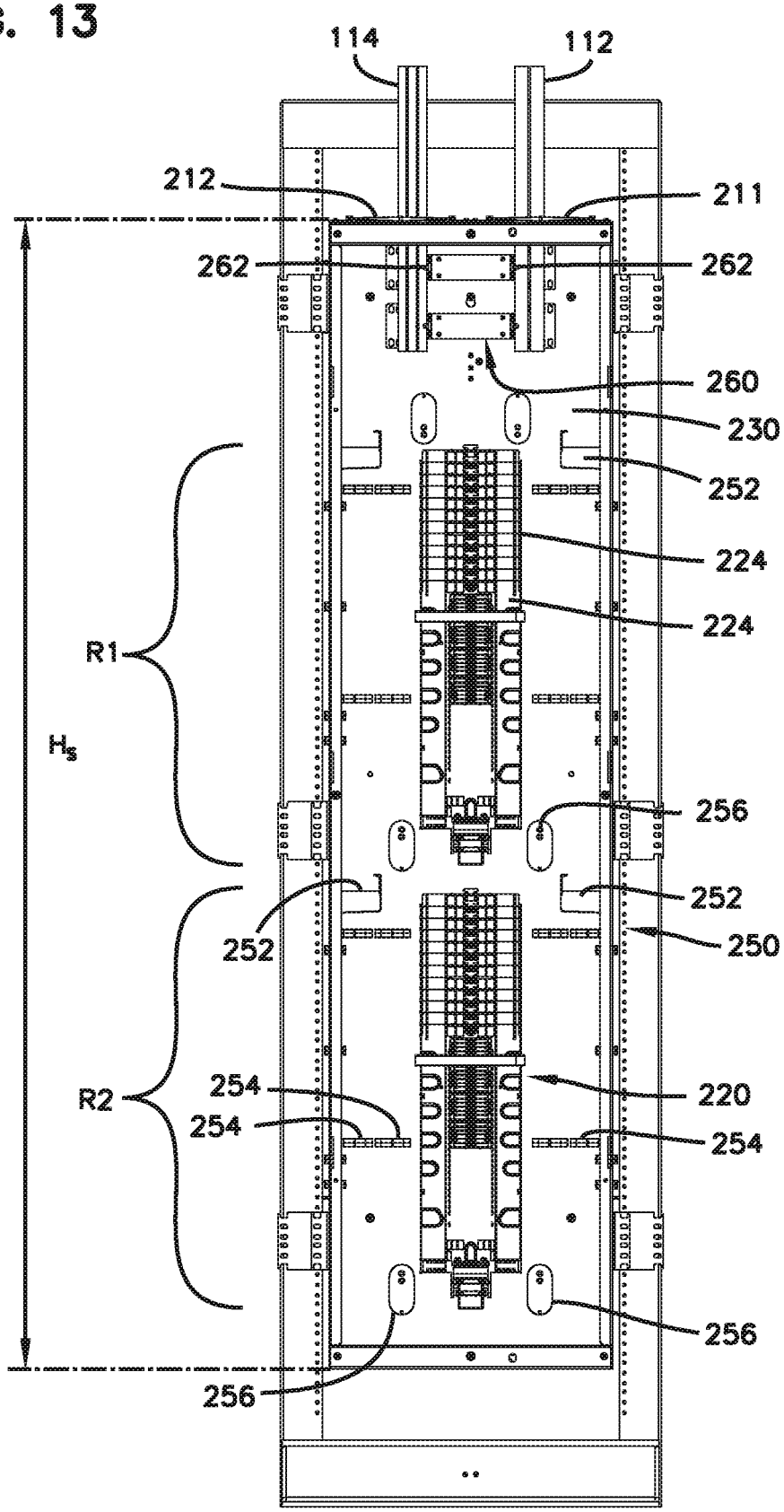
FIG. 13 is a front elevational view of the splice equipment assembly of FIG. 11.

The splice equipment assembly 200 receives two sets of cables—a first set of one or more trunk cables 112 and a second set of one or more equipment cables 114. As shown in FIG. 12, in certain implementations, the splice equipment assembly 200 receives both sets of cables 112, 114 from a common side or end of the splice equipment assembly 200. One or more fibers of the trunk cables 112 can be spliced to a corresponding equipment cable fibers. The equipment cables 114 can then be routed to equipment at other frames (e.g., via an overhead fiber raceway).

In certain implementations, the splice equipment assembly 200 can be configured to manage at least 1,728 optical splices. In certain implementations, the splice equipment assembly 200 can be configured to manage at least 2,592 optical splices. In certain implementations, the splice equipment assembly 200 can be configured to manage at least 3,456 optical splices. In certain implementations, the splice equipment assembly 200 can be configured to manage at least 5,184 optical splices. In certain implementations, the splice equipment assembly 200 can be configured to manage at least 6,912 optical splices.

The first set of cables includes one or more trunk cables 112, each including a plurality of optical fibers. In various implementations, the first set includes one trunk cable 112, two trunk cables 112, four trunk cables 112, eight trunk cables 112, twelve trunk cables 112, sixteen trunk cables 112 or any desired number of trunk cables 112. In an example, the first set of cables may include four trunk cables 112 each having 1728 optical fibers. In another example, the first set of cables may include eight trunk cables 112 each having 864 optical fibers. In various implementations, the second set of cables includes one equipment cable 114, two equipment cables 114, sixteen equipment cables 114, twenty-four equipment cables 114, forty-eight equipment cables 112, or any desired number of equipment cables 114. In an example, the second set of cables 114 may include sixteen equipment cables 114 each having 432 optical fibers. In another example, the second set of cables may include twenty-four equipment cables 114 each having 288 optical fibers. In another example, the second set of cables may include forty-eight equipment cables 114 each having 144 optical fibers.

As shown in FIG. 12, the splice equipment assembly 200 includes a body 202 and a cover 204. The body 202 defines an interior 206 accessible through an access aperture 208. The cover 204 is movable to selectively cover and expose the access aperture 208. In some examples, the cover 204 is pivotable relative to the body 202. In other examples, the cover 204 is removable from the body 202 (e.g., by lifting the cover 204 to free tabs of the cover 204 from slots defined by the body 202).

The splice equipment assembly 200 has a height $H_M$. In certain examples, the height $H_M$ of the splice equipment assembly 200 extends along a majority of a height of the frame 100, 150.

In certain implementations, the body 202 of the splice equipment assembly 200 includes a rear wall 230, a first side wall 232, an opposite second side wall 234, a bottom wall 236, and a top wall 238. In certain examples, the access aperture 208 is disposed at an open front of the bod 202. For example, the access aperture 208 may be defined by edges of the first side wall 232, the second side wall 234, the bottom wall 236, and the top wall 238. Retaining lips 240 may extend into the access aperture 208 from the bottom wall 236 and/or from the top wall 238. The cover 204 closes the open front of the body 202 when mounted to the body 202.

In certain examples, the cable port arrangement 210 is disposed at the top wall 238. In some examples, the cable port arrangement 210 includes a single aperture through which multiple trunk cables 112 and equipment cables 114 may extend. In other examples, the cable port arrangement 210 includes a plurality of apertures through which respective cables may extend. For example, the cable port arrangement 210 includes a first cable port 211 through which the first set of cables 112 pass and a second cable port 212 through which the second set of cables 114 pass.

In some examples, the cable port arrangement 210 is environmentally sealed. In other examples, the cable port arrangement 210 may include a non-sealing cover to inhibit dust or other such contaminants from entering the splice enclosure. In an example, the cover 214 includes a brush-style element extending across the one or more apertures of the trunk cable port arrangement 210.

In certain implementations, the trunk cables 112 and/or equipment cables 114 may be anchored within the interior 206 of the splice equipment assembly 200. For example, an anchor station 260 may be disposed within the splice equipment assembly 200 (e.g., at the rear wall 230). In certain examples, the anchor station 260 is disposed at an upper portion of the splice module interior 206 adjacent the trunk cable port arrangement 210. In certain examples, the anchor station 260 includes one or more rails 262 extending forwardly of the rear wall 230. Cable ties or other fasteners can hold one or more of the cables 112, 114 to the rails 262. In the example shown, the anchor station 260 includes a two rails 262—one for the first set of cables 112 and one for the second set of cables 114.

One or more splice trays 224 are disposed within the interior 206. The trunk cables 112 are optically coupled to the equipment cables 114 at the splice trays 224. A user may access the splice trays 224 through the access aperture 208. The splice trays 224 can be organized into one or more splice tray assemblies 220. Each splice tray assembly 220 includes one or more splice trays 224 coupled to a mounting frame 222. In certain examples, the mounting frame 222 secures to the rear wall 230. In certain implementations, the splice tray assemblies 220 are the same as the splice tray assemblies 3220 of FIGS. 6 and 7.

In certain implementations, each splice tray 224 has a first major side and an opposite second major side. The first major side carries splice holders 226 at which optical splices can be stored. A removable cover can be disposed at the first major side to cover the splice holders (e.g., see FIG. 7). Each tray 224 may be separately movable relative to the frame 222 between a stowed position (FIGS. 13-17) and an access position (front tray 3224 in FIG. 7). When in the access position, the first major side of the tray 224 is accessible to a technician. When in the stowed position, the first major side faces the rear wall 230 of the splice equipment assembly 200 while the second major side faces the access aperture 208. In certain examples, each tray 224 pivots between the stowed and access positions. In certain examples, each tray 224 pivots about a pivot axis defined at the mounting frame 222.

In certain examples, a restraining arrangement (e.g., a tie strap) may be provided to retain one or more of the splice trays 224 in each assembly 220 in the stowed position. When no trays 224 need to be accessed, the restraining arrangement may extend around all of the splice trays 224 of an assembly 220 to hold the splice trays 224 in the stowed position. When access to a tray is desired, the restraining arrangement may hold the trays 224 rearward of the tray to be accessed in the stowed position.

In certain examples, the trays 224 are staggered along the mounting frame 222 for easier access. For example, each tray 224 may be mounted at a different position along a ramped surface of the frame 222. In certain implementations, the mounting frame 222 is oriented so that the ramped surface extends forwardly of the rear wall 230. Accordingly, splice trays 224 at a rear of the mounting frame 222 are located higher (closer to the top wall 238) than splice trays 224 at the front of the mounting frame 222. When a splice tray 224 is accessed, the splice tray 224 (and any splice tray forward of the tray to be accessed) is moved to the access position. The staggering allows the trays 224 to be pivoted to the access position without interference from the other trays in the assembly 220.

In certain examples, the splice trays 224 are removably mounted to the frame 222 so that one or more of the trays 224 can be removed from the frame 222 and moved to a nearby work surface without disconnecting the already spliced cables. For example, each splice tray 224 can be independently removable from the respective mounting frame 222 without disconnecting the other splice trays 224 from the mounting frame 222. In certain examples, the splice trays 224 mounted in front of the tray 224 to be removed are pivoted to the access position before the tray 224 is removed.

In some implementations, optical splicing between the equipment cable fibers and the trunk cable fibers is performed while the splice tray 224 is mounted to the frame 222 within the splice equipment assembly 200. For example, the desired splice tray 224 can be pivoted or otherwise moved to the access position, the cover 228 can be removed, and the optical splices can be mounted to the tray 224. In other implementations, the splice tray 224 is removed from the splice equipment assembly 200 to optically splice the equipment cable fibers and the trunk cable fibers. For example, the fibers routed to the splice tray 224 can be unhooked from the radius limiter 256 and released from the cable clips 254 to enable the splice tray 224 to be removed from the frame 222 and moved to a work station external of the splice equipment assembly 200.

Referring to FIGS. 13-17, certain implementations of the splice equipment assembly 200 includes a cable routing arrangement 250 that facilitates routing the cables 112, 114 from the cable ports 210, 211, 212 to the splice trays 224. In some implementations, the cable routing arrangement 250 includes various routing guides that define at least a first routing path P3 between the trunk cable port arrangement 211 and at least one splice tray 224 and a second routing path P4 between an equipment cable port 212 and the at least one splice tray 224 (see FIG. 14).

The first and second routing paths P3, P4 provide sufficient slack for the cables 112, 114 to enable a user to move a splice tray 224 from the splice equipment assembly 200 to a work station outside of the splice equipment assembly 200. For example, a splice tray 224 can be disconnected from the mounting frame 222, the corresponding cables can be unfurled from the cable routing arrangement 250, and the tray 224 can be moved out of the interior 206 of the body 202 without disconnect the cables 112, 114 from the tray 224. The unfurled length of the cables 112, 114 limits how far the splice tray 224 can extend from the splice equipment assembly 200.

In accordance with certain aspects of the disclosure, the first routing path P3 and the second routing path P4 do not cross or otherwise overlap each other. For example, in certain implementations, the first routing path P3 extends at least partially along the first side wall 232 and does not extend along the second side wall 234 while the second routing path P4 extends at least partially along the second side wall 234 and does not extend along the first side wall 232. In certain examples, the first routing path P3 extends at least partially along the rear wall 230. In certain examples, the second routing path P4 extends at least partially along the rear wall 230. In certain implementations, none of the routing paths P3, P4 extend circumferentially around the splice trays 224. Advantageously, by not crossing or otherwise overlapping the routing paths P3, P4, a splice tray 224 to which fibers are routed can be more easily removed from the splice equipment assembly 200 without disconnecting the fibers from the splice tray 224.

In certain implementations, the first and second routing paths P3, P4 are symmetrical. In certain implementations, the first and second routing paths P3, P4 are configured such that the fibers of the trunk and equipment cables 112, 114 routed to a common splice tray 224 have a common length between the anchor station 260 and the splice tray 224.

In certain implementations, the cable routing arrangement 250 includes a combination of bend radius limiters 252, 256 and cable clips 254. For example, various bend radius limiters 252, 256 may be disposed at upper and/or lower portions of the cable routing paths P3, P4 to create multiple loops or layers within the path. The cable clips 254 manage the fibers along the paths P3, P4 (e.g., by holding the fibers to the respective walls).

In certain implementations, the cable routing arrangement 250 includes at least one bend radius limiter (e.g., half-spool) 252 extending from an inner surface of each of the first and second walls 232, 234. The cable routing arrangement 250 also may include two bend radius limiters (e.g., rods) 256 extending forwardly from the rear wall 230. In certain examples, the half spools 252 and rods 256 are disposed above at near the top of the splice tray assembly 220. In certain examples, the two rods 256 are disposed at opposite sides of the splice tray assembly 220. In certain examples, the cable routing arrangement 250 also includes an additional two bend radius limiters (e.g., rods) 256 disposed beneath or near the bottom of the splice tray assembly 220. In certain examples, the two additional rods 256 are disposed at opposite sides of the splice tray assembly 220. In certain examples, each rod 256 includes a radial flange at a forward end of the rod 256 to aid in retaining fibers on the rod 256.

In certain implementations, the cable routing arrangement 250 includes cable clips 254 disposed on the rear wall 230, the first side wall 232, and the second side wall 234. In certain examples, the cable clips 254 on the rear wall 230 define a vertical path and the cable clips 254 on each side wall 232, 234 define two vertical paths. In certain examples, each vertical path is defined by a pair of cable clips 254 disposed side-by-side.

Figure 14:
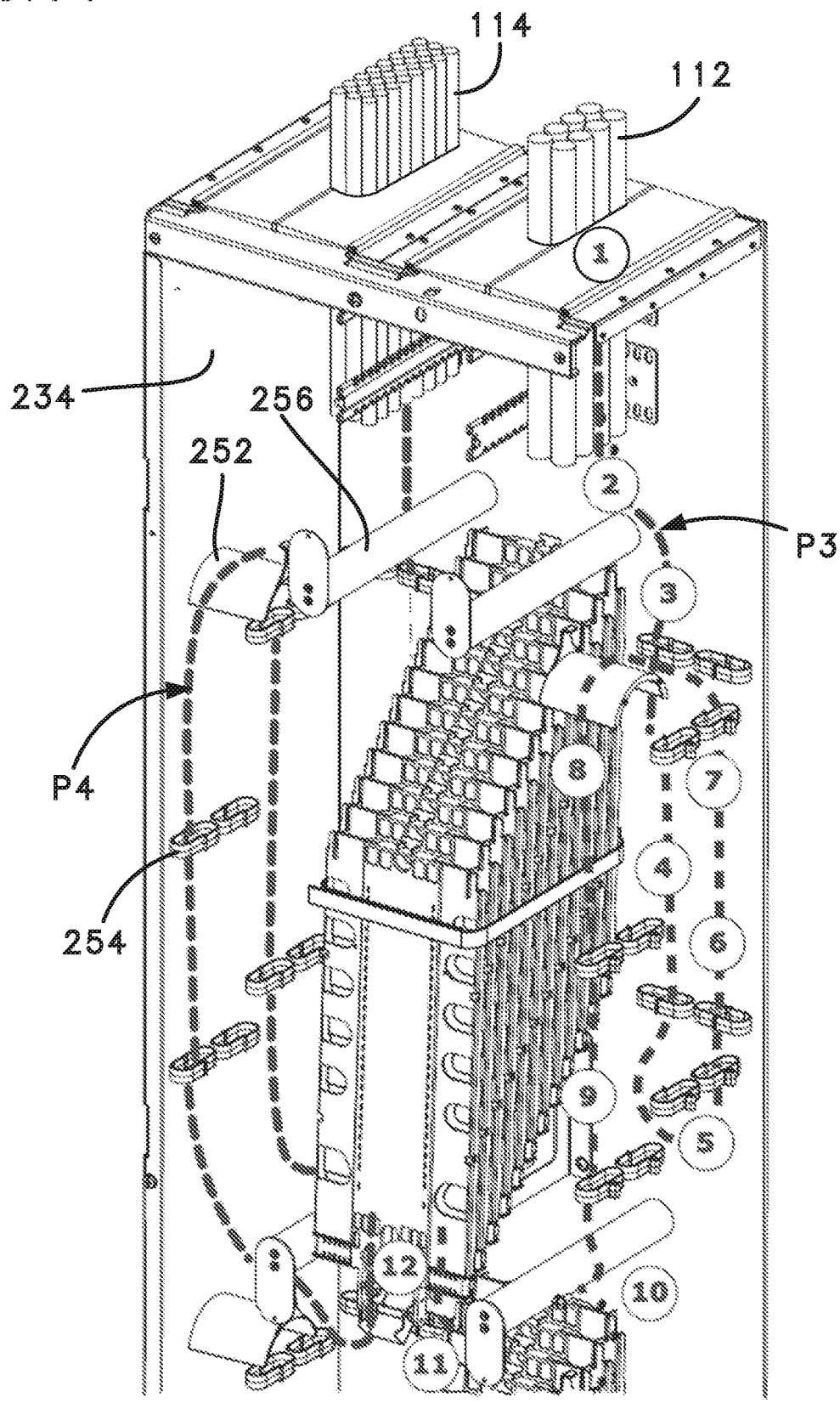
FIG. 14 is an enlarged perspective view of a top portion of FIG. 12 with a first side wall of the splice equipment assembly being made transparent to reveal internal components mounted to the first side wall.
Figure 15:
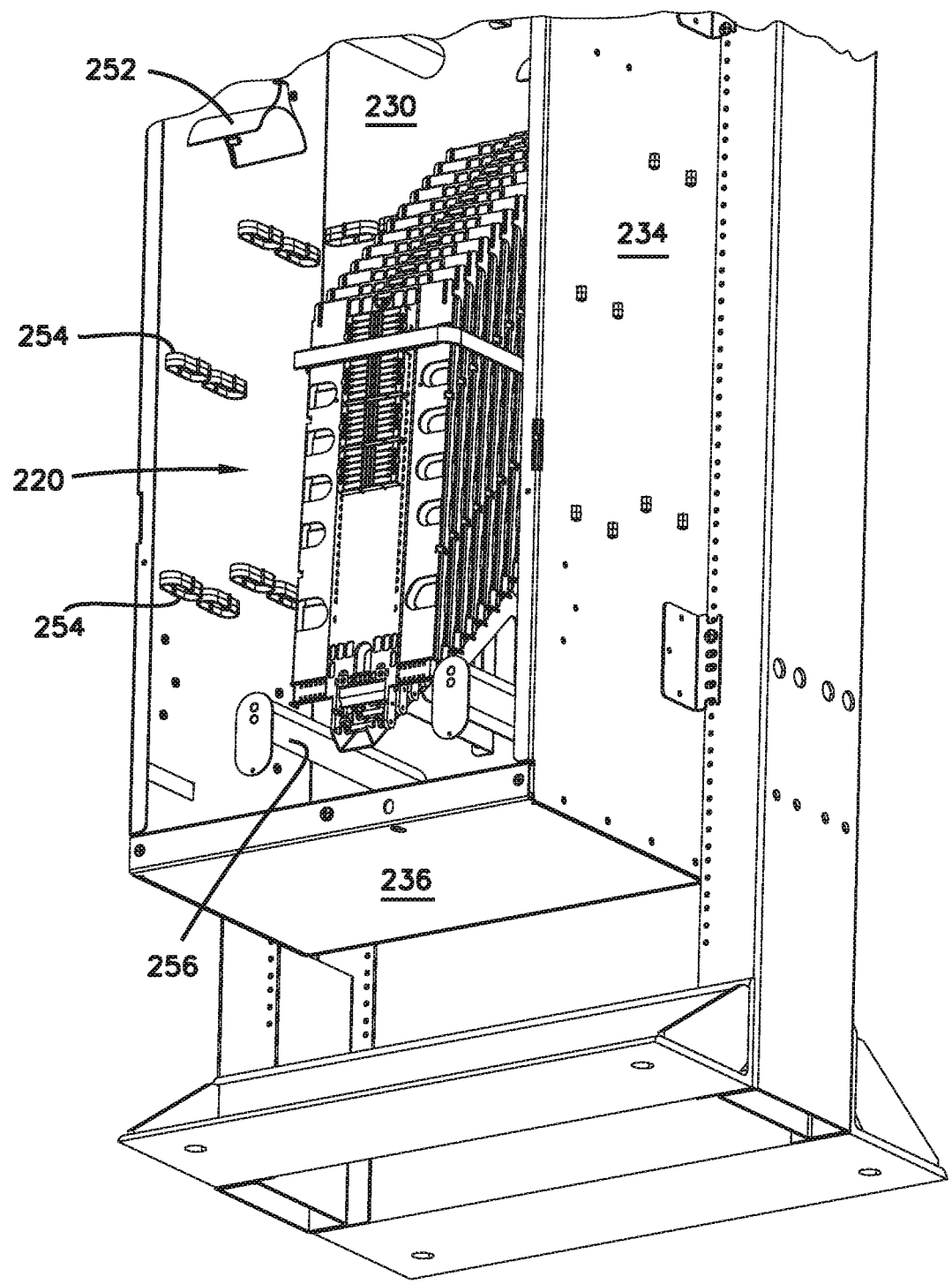
FIG. 15 is a perspective view of a bottom portion of the splice equipment assembly of FIG. 12 where an interior of the second side wall is visible.
Figure 16:
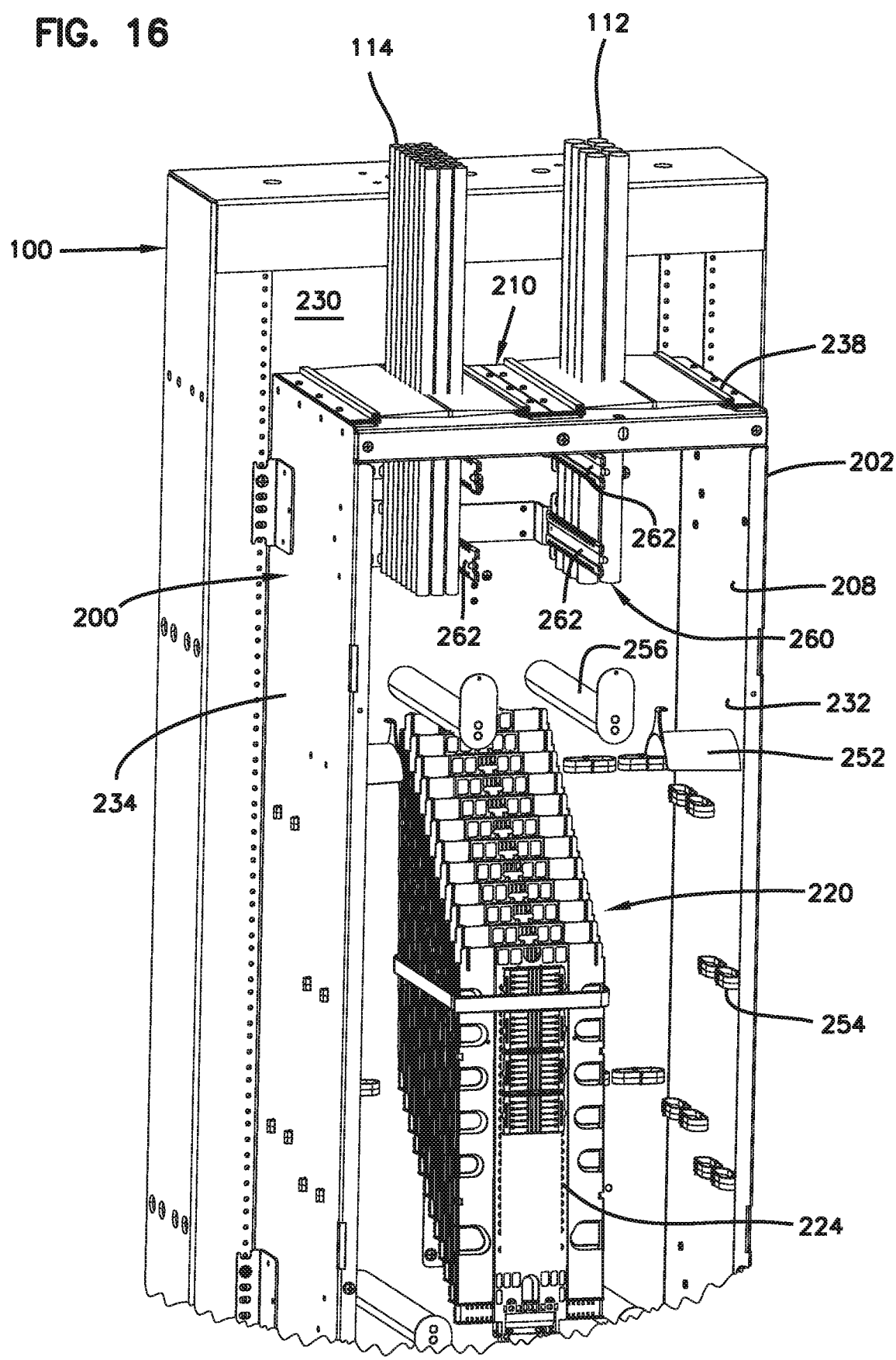
FIG. 16 is a perspective view of the top portion of the splice equipment assembly of FIG. 12 where an interior of the first side wall is visible.
Figure 17:
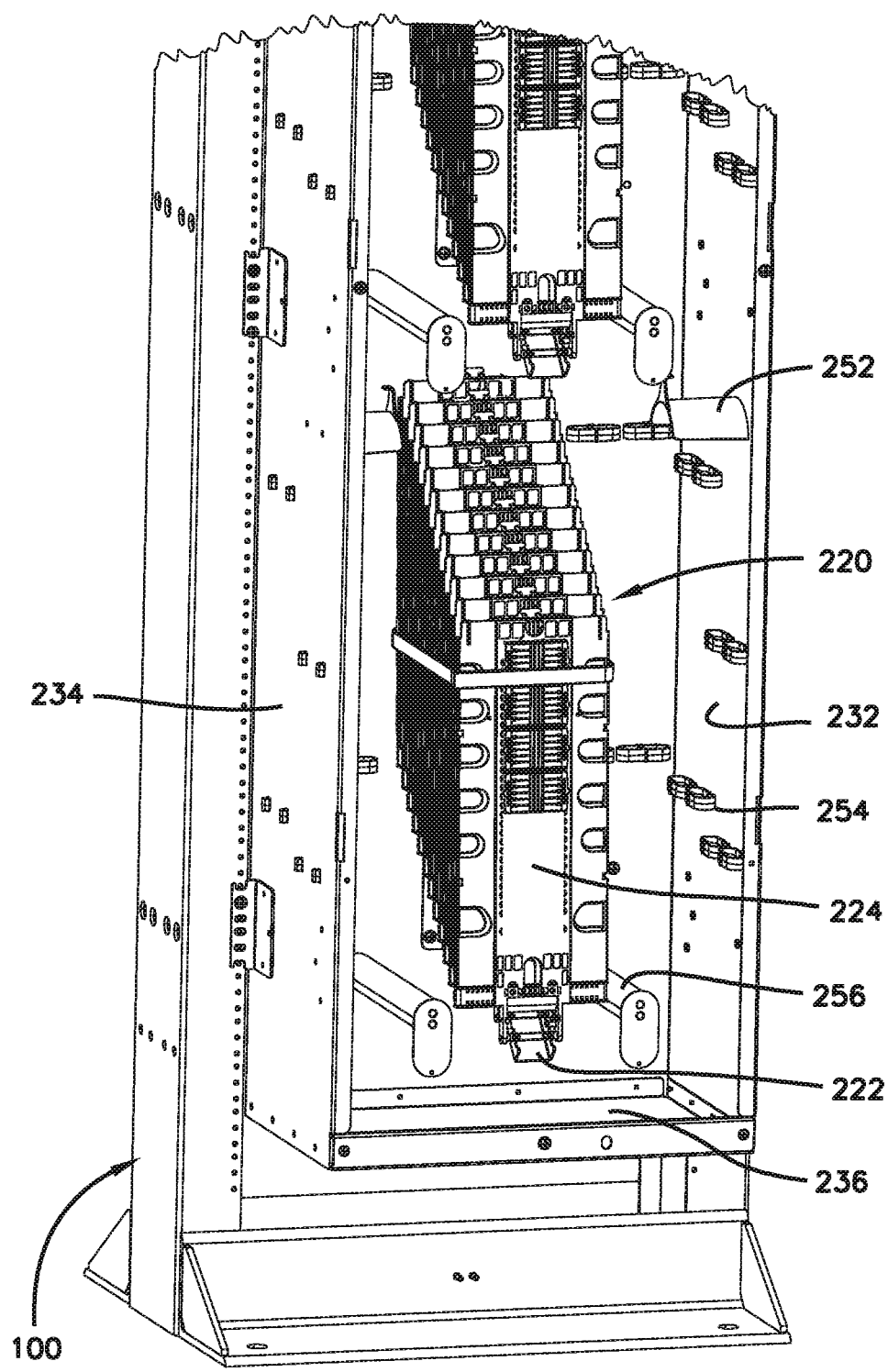
FIG. 17 is a perspective view of a bottom portion of the splice equipment assembly of FIG. 12 where an interior of the first side wall is visible.

In the example shown in FIG. 14, an example first cable routing path P3 extends from the trunk cable port 211 (see 2) and at least partially down the rear wall 230 (see 3 and 4). The cable clips 254 provided at the rear wall 230 hold the fibers to the rear wall 230. The first cable routing path P3 loops back up an inner surface of the first side wall 232 (see 5). Cable clips 254 provided at the inner surface of the first side wall 232 hold the fibers to the first side wall 232 in the first vertical path (see 5 and 7). The fibers are looped over the half spool 252 (see 8) and routed back down the inner surface of the first side wall 232. Cable clips 254 provided at the inner surface hold the fibers to the wall 232 in the second vertical path (see 9). Finally, the first cable routing path P3 extends from the first side wall 232, beneath one of the rods 256 (see 10 and 11), and up towards one of the splice trays 224 (see 12). In certain examples, the rod 256 is sufficiently deep to facilitate routing the cable fibers to any of the splice trays 224 in the splice tray assembly 220.

In the example shown in FIG. 14, the second cable routing path P4 follows the same pattern using the second side wall 234. For example, the second cable routing path P4 extends from the equipment cable port 212 and at least partially down the rear wall 230, loops back up an inner surface of the second side wall 234, loops over the half spool 252 at the second side wall 234, and routes back down the inner surface of the second side wall 234. Finally, the second cable routing path P4 extends from the second side wall 234, beneath one of the rods 256, and up towards one of the splice trays 224. The cable clips 254 at the rear and second side walls 230, 234 hold the fibers to the respective walls in vertical paths.

In certain implementations, multiple groups 220 of splice trays 224 are disposed within the interior 206 of the splice equipment assembly 200. In such implementations, separate first routing paths P3 lead from the trunk cable port 211 to the respective splice tray assemblies 220 and separate second routing paths P4 lead from the equipment port 212 to the respective splice tray assemblies 220.

In certain examples, the interior 206 of the splice equipment assembly 200 includes a plurality of regions R1, R2 with each region R1, R2 having a respective splice tray assembly 220. Each region R1, R2 also includes a respective cable routing arrangement 250. Accordingly, each region R1, R2 has respective first and second cable routing paths P3, P4 about the respective cable routing arrangement 250 to the respective splice tray assembly 220.

In certain examples, the regions are disposed in a vertical column. In the example shown in FIG. 13, a first region R1 is disposed above a second region R2. In certain implementations, the cable routing arrangement 250 of the first region R1 does not overlap the cable routing arrangement 250 of the second region R2. In other examples, the splice equipment assembly 200 may include additional regions.

For example, one first routing path P3 extends from the trunk cable port 211 towards a first splice tray assembly 220 in the first region R1 and another first routing path P3 extends from the trunk cable port 211 towards a second splice tray assembly 220 in the second region R2. One second routing path P4 extends from the equipment cable port 212 towards the first splice tray assembly 220 in the first region R1 and another second routing path P4 extends from the equipment cable port 212 towards the second splice tray assembly 220 in the second region R2.

In certain implementations, the first routing paths P3 are configured such that the trunk cables 112 routed to the splice tray assembly 220 of the first region R1 have a common length with the trunk cables 112 routed to the splice tray assembly 220 of the second region R2. In certain implementations, the second routing paths P4 are configured such that the equipment cables 114 routed to the splice tray assembly 220 of the first region R1 have a common length with the equipment cables 114 routed to the splice tray assembly 220 of the second region R2.

FIGS. 18-22 illustrate various ways in which the splice equipment assembly 200 can be mounted at an installation site. The splice equipment assembly 200 includes multiple mounting stations 276, 278, 286 to which brackets 270, 280 can be coupled to the body 202 of the splice equipment assembly 200. For example, a first mounting station 276 (visible in FIG. 18) is configured to recess-mount the splice equipment assembly 200 at a frame (see FIG. 20). A second mounting station 278 (visible in FIG. 20) is configured to enable the splice equipment assembly 200 to protrude outwardly from the frame (see FIG. 18). A third mounting station 286 is configured to enable the splice equipment assembly 200 to mount to a wall. In certain implementations, each mounting station 276, 278, 286 is repeated along the height of the splice equipment assembly 200.

Figure 18:
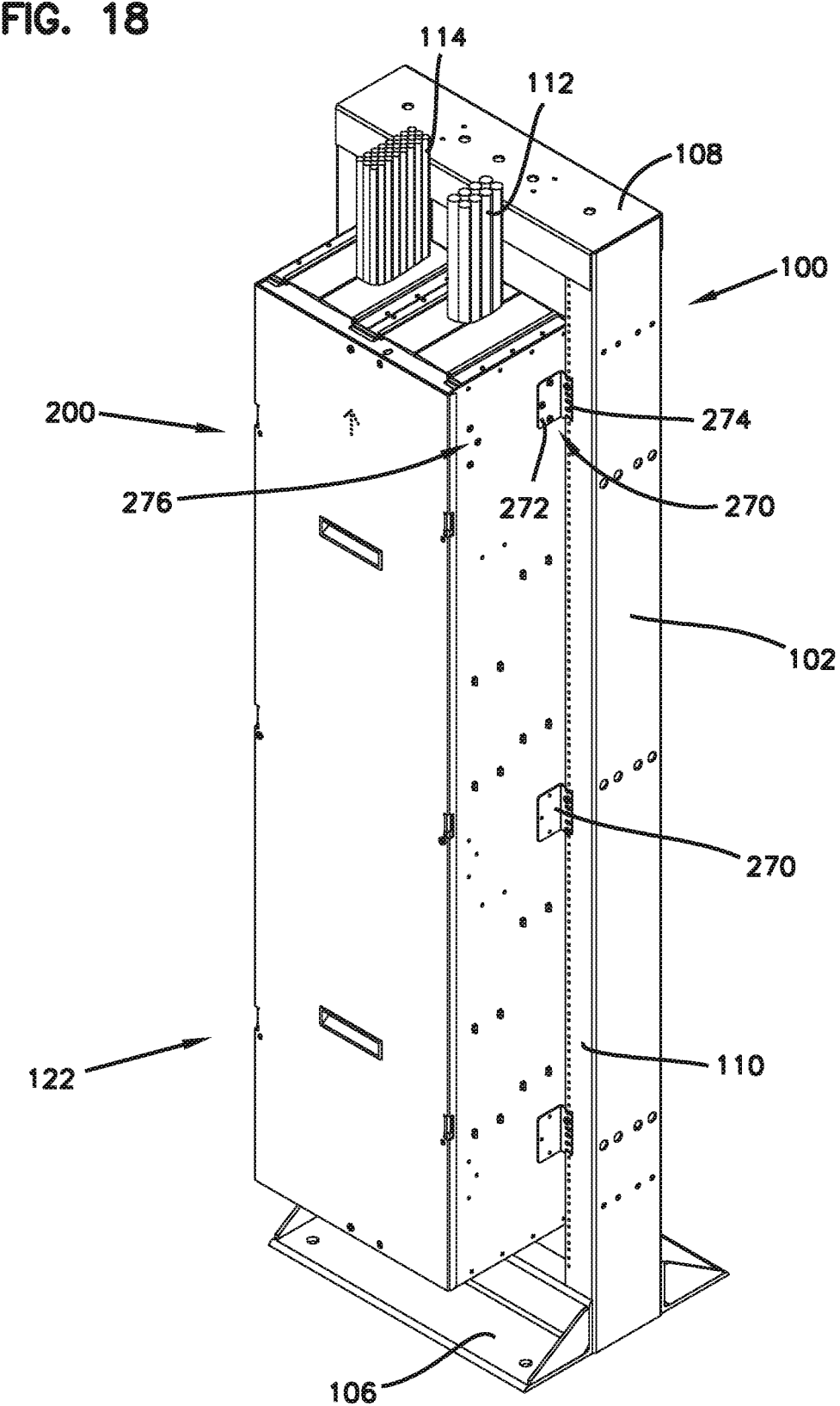
FIG. 18 shows the splice equipment assembly of FIG. 11 mounted to an example two-post frame.

In FIG. 18, the splice equipment assembly 200 is mounted at a front 122 of a first example frame 100. In the example shown, the first example frame 100 includes a two-post frame having two posts 102 extending upwardly from a base 106. A top 108 of the frame 100 connects the two posts 102. A central zone 104 extends between the two posts 102.

Brackets 270 are installed to the second mounting stations 278 of the splice equipment assembly 200. In certain examples, the brackets 270 are L-shaped brackets having first sections 272 to couple to a respective side wall 232, 234 of the splice equipment assembly 200 and second sections 274 that couple to mounting plates 110 of the frame 100. In FIG. 18, the brackets 270 are mounted towards the rear of the splice equipment assembly 200 so that a majority of the depth of the splice equipment assembly 200 extends outwardly from the frame 100.

In alternative implementations, the brackets 270 could be mounted at the first mounting stations 276 allowing the splice equipment assembly 200 to be recessed-mounted within the frame 100. If the splice equipment assembly 200 were recessed-mounted, then the body 202 of the splice equipment assembly 200 would extend between the two posts 102 and outwardly past the rear 124 of the frame 100.

Figure 19:
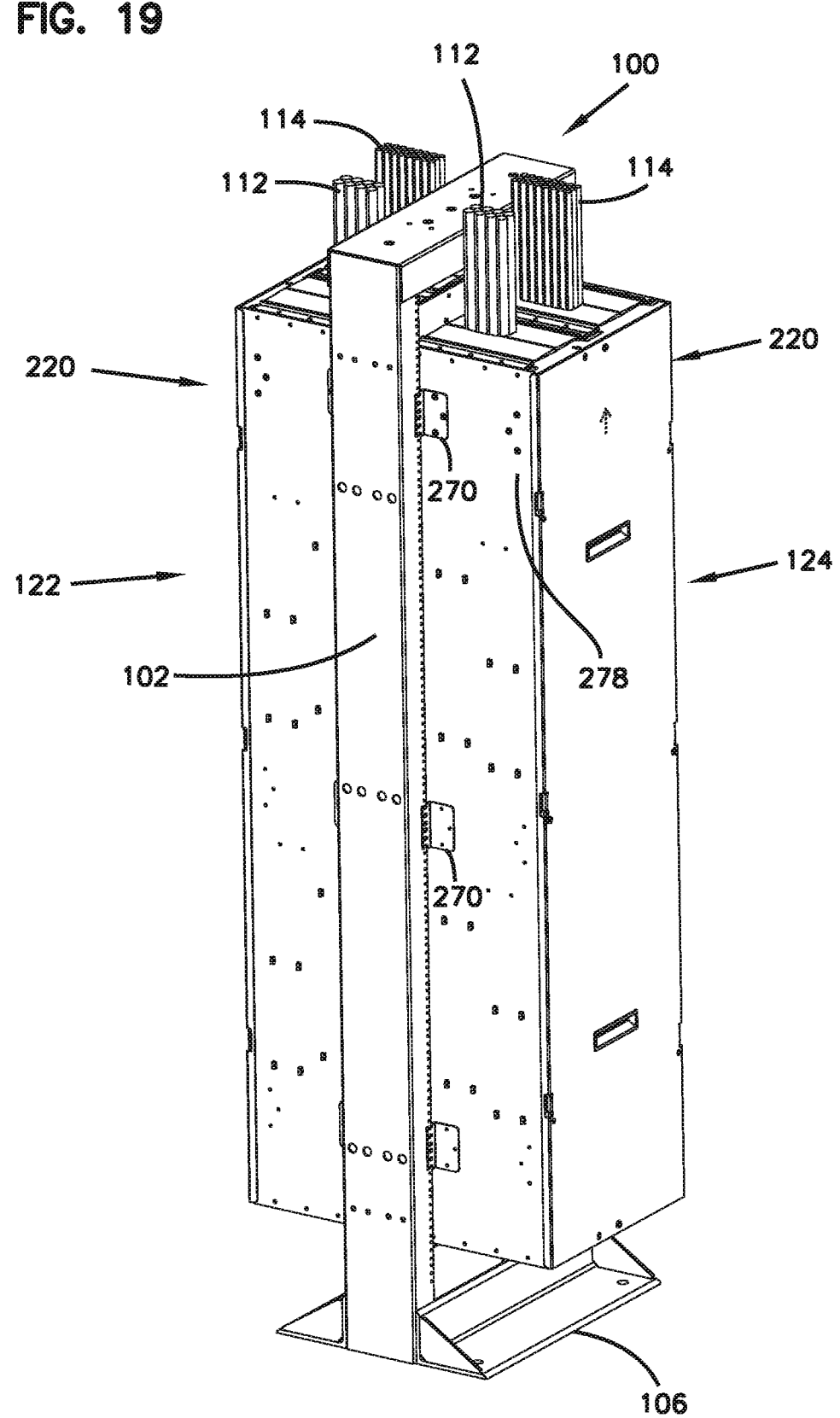
FIG. 19 shows a second splice equipment assembly mounted to the rear of the frame in FIG. 18.

FIG. 19 illustrates an advantage of mounting the splice equipment assembly 200 to protrude from the frame as shown in FIG. 18. In FIG. 19, two splice equipment assemblies 200 can be mounted to the same two-post frame 100. Brackets 270 are disposed at the second mounting stations 278 of each splice equipment assembly 200. A first splice equipment assembly 200 is mounted to protrude from the front 122 of the frame 100 and a second splice equipment assembly 200 is mounted to protrude from the rear 124 of the frame 100. The cover 204 of the first splice equipment assembly 200 faces forwardly from the front 122 of the frame 100 and the cover 204 of the second splice equipment assembly 200 faces rearwardly from the rear 124 of the frame 100. Accordingly, the first splice equipment assembly 200 is accessed from the front 122 of the frame 100 and the second splice equipment assembly 200 is accessed from the rear 124 of the frame 100.

Figure 20:
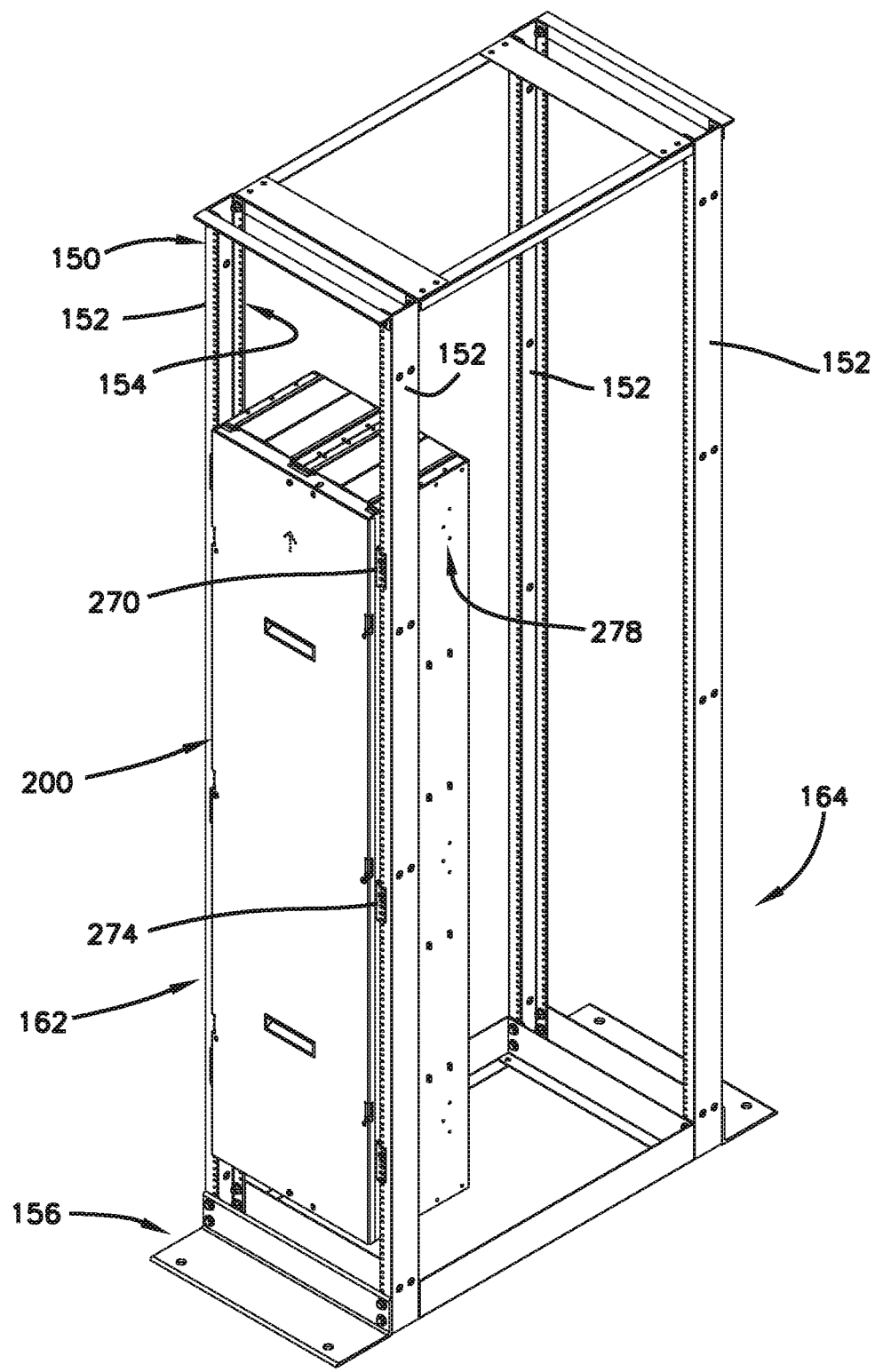
FIG. 20 shows the splice equipment assembly of FIG. 11 mounted to an example four-post frame.

In FIG. 20, the splice equipment assembly 200 is mounted at a front 162 of a second example frame 150. In the example shown, the second example frame 150 includes a four-post frame having two posts 152 extending upwardly from a base 156 at the front 162 of the frame 150 and another two posts 152 extending upwardly from the base 156 at a rear 164 of the frame 150. A top of the frame 150 connects the four posts 152. A central zone 154 extends between each pair of posts 152.

Brackets 270 are installed to the first mounting stations 276 of the splice equipment assembly 200. In FIG. 20, the brackets 270 are mounted towards the front of the splice equipment assembly 200 so that a majority of the depth of the splice equipment assembly 200 extends between the respective posts 152 and into the frame 150. Recess-mounting the splice equipment assembly 200 relative to the frame 150 reduces the footprint of the overall installation. In alternative implementations, the brackets 270 could be mounted at the second mounting stations 278 allowing the splice equipment assembly 200 to be mounted to protrude from the frame 100.

Figure 21:
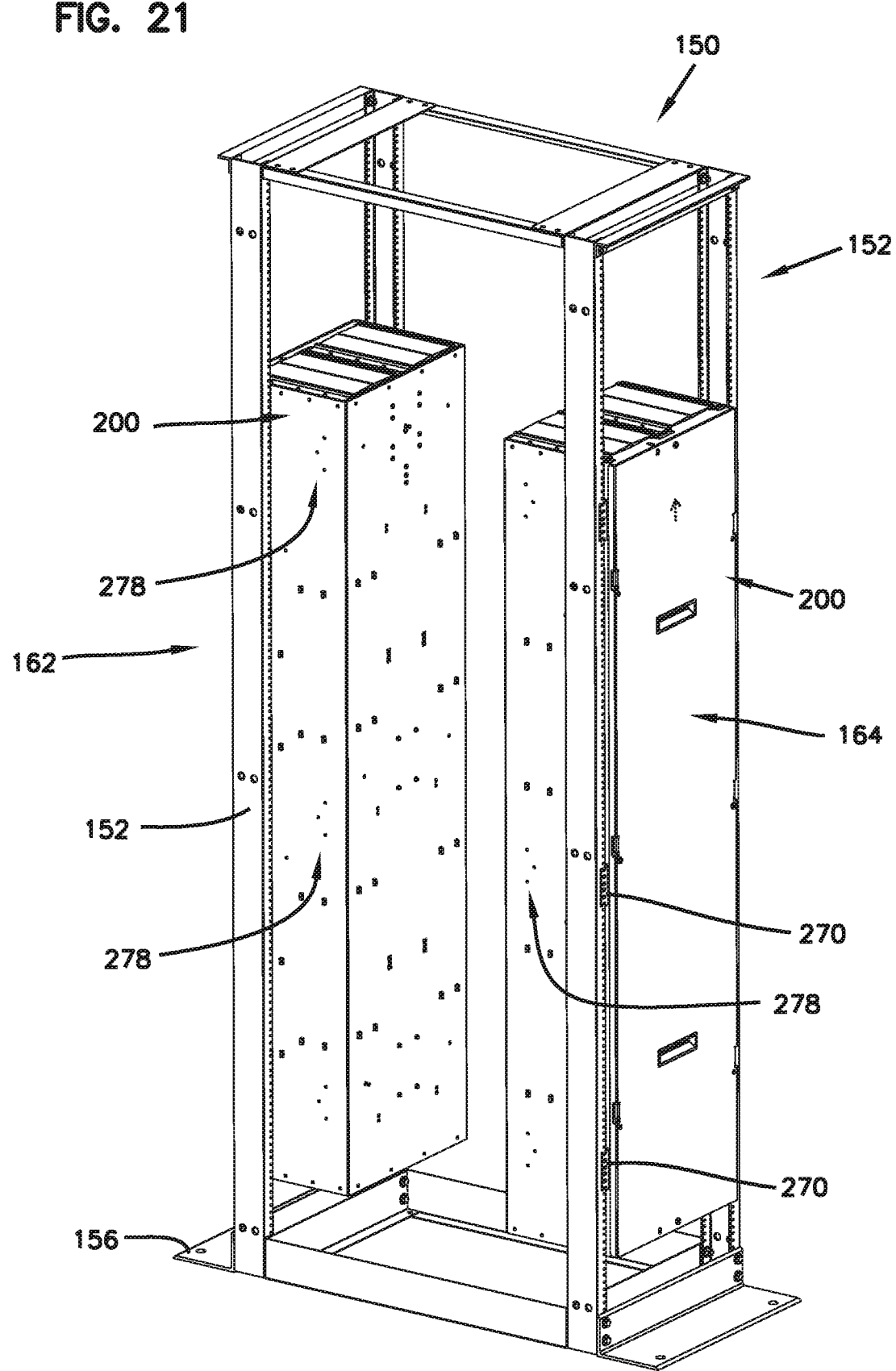
FIG. 21 shows a second splice equipment assembly mounted to the rear of the frame in FIG. 20.

FIG. 21 illustrates an advantage of mounting the splice equipment assembly 200 to a four-post frame 150. In FIG. 21, two splice equipment assemblies 200 can be recess-mounted to the same four-post frame 100. Brackets 270 are disposed at the first mounting stations 276 of each splice equipment assembly 200. A first splice equipment assembly 200 is recess-mounted at the front 162 of the frame 150 and a second splice equipment assembly 200 is recess-mounted to the rear 164 of the frame 100. The cover 204 of the first splice equipment assembly 200 faces forwardly from the front 162 of the frame 150 and the cover 204 of the second splice equipment assembly 200 faces rearwardly from the rear 164 of the frame 150. Accordingly, the first splice equipment assembly 200 is accessed from the front 162 of the frame 150 and the second splice equipment assembly 200 is accessed from the rear 164 of the frame 150.

Figure 22:
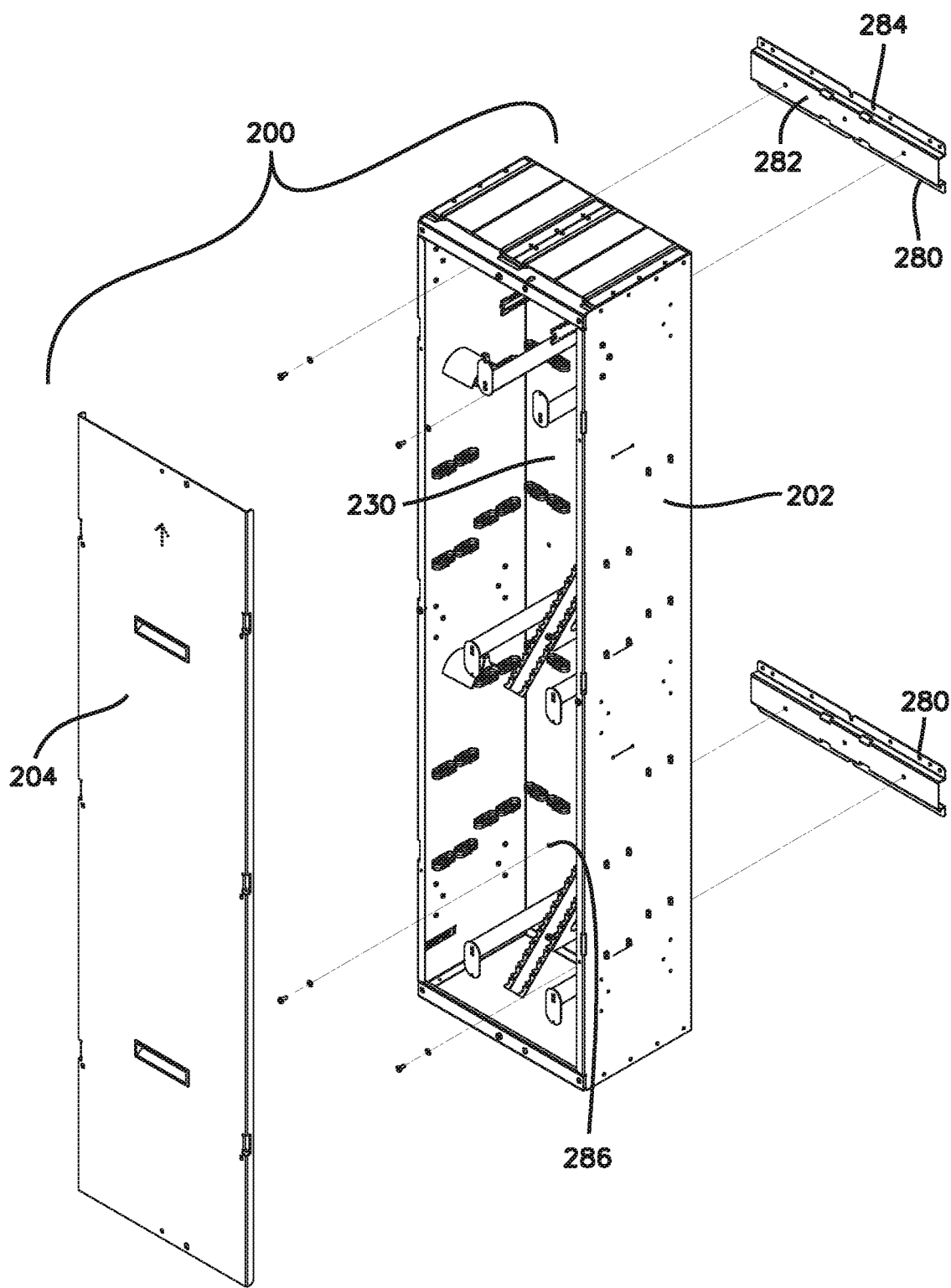
FIG. 22 shows the splice equipment assembly of FIG. 11 exploded from example wall-mounting brackets.

In FIG. 22, two brackets 280 are shown exploded from an exterior of the rear wall 230 of the splice equipment assembly 200. The brackets 280 are configured to mount the splice equipment assembly 200 to a wall or other vertical surface. Each bracket 280 includes a central portion 282 protruding forwardly from flanges 284. The central portion 282 is configured to be coupled (e.g., fastened) to the exterior of the rear wall 230. The flanges 284 are configured to be coupled (e.g., fastened) to the wall or other vertical surface.

Various examples have been described in detail with reference to the drawings, wherein like reference numerals represent like parts and assemblies throughout the several views. Any examples set forth in this disclosure are not intended to be limiting and merely set forth some of the many possible ways for implementing the broad inventive aspects disclosed herein.

What is claimed is:

1. A splice equipment assembly comprising:
   a housing having a height extending between a top and a bottom, a width extending between a first side and a second side, and a depth extending between a rear and an open front providing access to an interior of the housing;
   a trunk cable port disposed at the top of the housing to provide access to the interior of the housing;
   an equipment cable port disposed at the top of the housing to provide access to the interior of the housing;
   a splice tray assembly disposed within the housing, the splice tray assembly including a mounting frame holding a plurality of pivotable splice trays mounted to the mounting frame in a stack, each splice tray being movable between a stowed position and an access position, the mounting frame of the splice tray assembly defining a mounting frame width extending from a first side of the mounting frame to a second side of the mounting frame, the first side of the mounting frame being adjacent the first side of the housing and the second side of the mounting frame being adjacent the second side of the housing;
a cable routing arrangement including a first set of guide members and a second set of guide members, the first set of guide members being configured to direct cables along a first cable routing path from the trunk cable port, down the rear of the housing, up the first side of the housing, over a spool, back down the first side of the housing, and over to the splice tray assembly, the first set of guide members including a plurality of guide members extending into the interior from the first side and the rear, the second set of guide members being configured to direct cables along a second cable routing path from the equipment cable port, down the rear of the housing, up the second side of the housing, over a spool, back down the second side of the housing, and over to the splice tray assembly, the second set of guide members including a plurality of guide members extending into the interior from the second side and the rear, wherein the trunk cable port is positioned at the top of the housing so as to direct cables between at least one of the first side of the mounting frame and the first side of the housing toward the first set of guide members and the second side of the mounting frame and the second side of the housing toward the second set of guide members, wherein the trunk cable port is positioned at the top of the housing so as to be outside the width of the mounting frame that is defined from the first side to the second side of the mounting frame when taken in a vertical direction; and
an anchor station disposed within the splice equipment assembly beneath the trunk cable port and extending into the interior from the rear of the housing;
wherein the interior of the housing has a first region and a second region disposed below the first region along a vertical column, wherein the splice tray assembly includes a first splice tray assembly disposed in the first region along the vertical column and a second splice tray assembly is disposed within the second region along the vertical column, wherein the mounting frames of the first and second splice tray assemblies are spaced apart, and wherein the first and second cable routing paths service the first region, and wherein additional first and second cable routing paths service the second region, wherein the splice trays of the first splice tray assembly and the second splice tray assembly are connected to the mounting frames to pivot around a pivot axis that is parallel to a direction extending from the first side toward the second side of the housing and that is perpendicular to the vertical column defined within the housing, wherein each of the splice trays of the plurality of splice trays of the first splice tray assembly and the plurality of splice trays of the second splice tray assembly are mounted to the housing such that first and second major faces of each splice tray are oriented perpendicular to a plane defined along the vertical column within the housing and parallel to the direction extending from the first side toward the second side of the housing;
wherein the splice trays are removably mounted to the mounting frame;
wherein the first and second cable routing paths are mirror images of each other;
wherein the first and second cable routing paths have a common length;
wherein the first and second cable routing paths each form a slack length;
wherein neither the first cable routing path nor the second cable routing path extend circumferentially around the splice tray assembly;
a plurality of cables in each of the first cable routing path and the second cable routing path extending from the trunk cable port and the equipment cable port, respectively, and a plurality of splices to form a plurality of spliced cables on the splice trays;
wherein corresponding cables are removable from the cable routing arrangement allowing the slack length and the splice trays to be removed from the mounting frame allowing access to the splice trays outside of the housing without disconnecting the plurality of spliced cables from the splice trays.

2. A rack assembly comprising:
a rack frame having a front and a rear, the rack frame including at least two posts, the rack frame defining a first side and a second side; and
a splice equipment assembly mounted to a housing that is mounted to the front of the rack frame so as to be generally positioned between the first and second sides of the rack frame, the housing including a cable routing arrangement, the cable routing arrangement including a plurality of guide members extending into the interior from a first side and a second side of the housing, and a second plurality of guide members extending into the interior from a rear of the housing, the splice equipment assembly extending along a majority of a height of the rack frame, the splice equipment assembly having at least one splice tray assembly holding a plurality of pivotable splice trays mounted to a mounting frame in a stack, each splice tray being movable between a stowed position and an access position, the housing of the splice equipment assembly including a cable port arrangement that defines at least one trunk cable port disposed at a top of the housing to provide access to the interior of the housing and at least one equipment cable port disposed at the top of the housing to provide access to the interior of the housing, the housing of the splice equipment assembly defining a first cable routing path and a second cable routing path, the first cable routing path extending within the housing of the splice equipment assembly from the cable port arrangement above the splice trays, along one side of the splice trays, and towards a bottom of the splice trays, the second cable routing path extending within the housing of the splice equipment assembly along an opposite side of the splice trays, and towards the bottom of the splice trays, the first cable routing path being a mirror image of the second cable routing path, the at least one trunk cable port disposed at the top of the housing being positioned for leading cables toward at least one of the first cable routing path and the second cable routing path, the splice equipment assembly further defining a width that extends between the one side of the splice trays to the opposite side of the splice trays, the one side of the splice trays being adjacent the first side of the rack frame and the opposite side of the splice trays being adjacent the second side of the rack frame, wherein the at least one trunk cable port is positioned at the top of the housing so as to direct cables between at least one of the one side of the splice trays and the first side of the rack frame toward the first cable routing path and the opposite side of the splice trays and the second side of the rack frame toward the second cable routing path, wherein the at least one trunk cable port is positioned at the top of the housing so as to be outside the width of the splice equipment assembly that is defined from the one side of the splice trays to the opposite side of the splice trays when taken in a vertical direction; and an anchor station disposed within the splice equipment assembly beneath from the cable port arrangement and extending into the interior from the rear of the rack frame;

wherein the interior of the housing has a first region and a second region disposed below the first region along in a vertical column defined through the housing, wherein the splice equipment assembly includes a first splice tray assembly disposed in the first region along the vertical column and a second splice tray assembly is disposed within the second region along the vertical column, wherein the mounting frame of each of the first and second splice tray assemblies are spaced apart, and wherein the first and second cable routing paths service the first region, and wherein additional first and second cable routing paths service the second region, wherein the splice trays of the first splice tray assembly and the second splice tray assembly are connected to the mounting frames to pivot around a pivot axis that is parallel to a direction extending from the first side toward the second side of the housing and that is perpendicular to the vertical column defined within the housing, wherein each of the splice trays of the plurality of splice trays of the first splice tray assembly and the plurality of splice trays of the second splice tray assembly are mounted to the housing such that first and second major faces of each splice tray are oriented perpendicular to a plane defined along the vertical columns within the housing and parallel to the direction extending from the first side toward the second side of the housing;

wherein the splice trays are removably mounted to the mounting frame;

wherein the first and second cable routing paths are mirror images of each other;

wherein the first and second cable routing paths have a common length;

wherein the first and second cable routing paths each form a slack length;

wherein neither the first cable routing path nor the second cable routing path extend circumferentially around the splice tray assembly;

a plurality of cables in each of the first cable routing path and the second cable routing path extending from the at least one trunk cable port and the at lest one equipment cable port, respectively, and a plurality of splices to form a plurality of spliced cables on the splice trays;

wherein corresponding cables are removable from the cable routing arrangement allowing the slack length and the splice trays to be removed from the mounting frame allowing access to the splice trays outside of the housing without disconnecting the spliced cables from the splice trays.

3. The rack assembly of claim 2, wherein the splice equipment assembly is recess mounted to the front of the rack frame.

4. The rack assembly of claim 2, wherein the splice equipment assembly is mounted to protrude forwardly from the front of the rack frame.

5. The rack assembly of claim 2, wherein the splice equipment assembly is a first splice equipment assembly; and wherein the rack assembly further comprises a second splice equipment assembly mounted at the rear of the rack frame.

6. The rack assembly of claim 5, wherein the second splice equipment assembly is recess mounted to the rear of the rack frame.

7. The rack assembly of claim 5, wherein the second splice equipment assembly is mounted to protrude rearwardly from the rear of the rack frame.

8. The rack assembly of claim 2, wherein the rack frame is a two-post frame.

9. The rack assembly of claim 2, wherein the rack frame is a four-post frame.

10. The rack assembly of claim 2, wherein the splice equipment assembly is wall-mountable.

11. A method of using the splice equipment assembly of claim 1, comprising:
pivoting one or more of the pivotable splice trays between the stowed position and the access position;
selecting a splice tray for removal from a pivotal mount of the splice equipment assembly; and
positioning the selected splice tray outside of the splice equipment assembly on a work surface.

* * * * *